(12) United States Patent
Yamamoto

(10) Patent No.: US 10,387,734 B2
(45) Date of Patent: Aug. 20, 2019

(54) VEHICLE DISPLAY CONTROL DEVICE AND VEHICLE DISPLAY CONTROL METHOD

(71) Applicant: DENSO CORPORATION, Kariya, Aichi-pref. (JP)

(72) Inventor: Norio Yamamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/549,462

(22) PCT Filed: Feb. 1, 2016

(86) PCT No.: PCT/JP2016/000488
§ 371 (c)(1),
(2) Date: Aug. 8, 2017

(87) PCT Pub. No.: WO2016/129233
PCT Pub. Date: Aug. 18, 2016

(65) Prior Publication Data
US 2018/0032824 A1 Feb. 1, 2018

(30) Foreign Application Priority Data
Feb. 9, 2015 (JP) ................................ 2015-023616

(51) Int. Cl.
*G06K 9/00* (2006.01)
*H04N 7/18* (2006.01)
(Continued)

(52) U.S. Cl.
CPC ............ *G06K 9/00805* (2013.01); *B60R 1/00* (2013.01); *B60R 1/12* (2013.01); *G01S 7/04* (2013.01);
(Continued)

(58) Field of Classification Search
None
See application file for complete search history.

(56) References Cited

U.S. PATENT DOCUMENTS

2003/0156019 A1 8/2003 Lehmann
2007/0085708 A1 4/2007 Kato et al.
(Continued)

FOREIGN PATENT DOCUMENTS

JP 2005-241511 A1 9/2005
JP 2008-250329 A 10/2008
(Continued)

*Primary Examiner* — Christopher Braniff
(74) *Attorney, Agent, or Firm* — Knobbe, Martens, Olson & Bear, LLP

(57) ABSTRACT

A vehicle display control device, which controls a display of sensor information on a display unit corresponding to each external sensors, includes an opening detection unit, an image storage unit, and an opening control unit. The vehicle is equipped with the display unit and the external sensors detecting outside obstacles. The opening detection unit detects an opening command made by a user to the vehicle. The image storage unit stores a vehicle image indicating the vehicle and area images indicating detection areas of the sensors. The obstacle is detectable within the detection areas. In response to a detection of the opening command by the opening detection unit, the opening control unit reads the vehicle image and each area image from the image storage unit, and displays the readout images on the display unit as the sensor information during an opening period.

10 Claims, 21 Drawing Sheets

(51) Int. Cl.
  *G08G 1/16* (2006.01)
  *G08G 1/0967* (2006.01)
  *B60R 1/00* (2006.01)
  *B60R 1/12* (2006.01)
  *G06F 3/14* (2006.01)
  *G01S 13/93* (2006.01)
  *G08G 1/0962* (2006.01)
  *G01S 15/93* (2006.01)
  *G01S 7/04* (2006.01)
  *G06T 11/60* (2006.01)
  *G08G 1/01* (2006.01)
  *G08G 1/04* (2006.01)
  *G08G 1/042* (2006.01)
  *G08G 1/052* (2006.01)
  *H04N 5/247* (2006.01)

(52) U.S. Cl.
  CPC .......... *G01S 13/931* (2013.01); *G01S 15/931* (2013.01); *G06F 3/1423* (2013.01); *G08G 1/0962* (2013.01); *G08G 1/0967* (2013.01); *G08G 1/165* (2013.01); *G08G 1/166* (2013.01); *G08G 1/167* (2013.01); *H04N 7/18* (2013.01); *H04N 7/181* (2013.01); *B60R 2001/1253* (2013.01); *B60R 2300/105* (2013.01); *B60R 2300/301* (2013.01); *B60R 2300/804* (2013.01); *B60R 2300/8026* (2013.01); *B60R 2300/8033* (2013.01); *B60R 2300/8066* (2013.01); *G06T 11/60* (2013.01); *G08G 1/0116* (2013.01); *G08G 1/04* (2013.01); *G08G 1/042* (2013.01); *G08G 1/052* (2013.01); *H04N 5/247* (2013.01)

(56) References Cited

U.S. PATENT DOCUMENTS

2014/0203925 A1* 7/2014 Augst .................... B60Q 9/007
  340/435
2016/0110619 A1* 4/2016 Kim .................. G06K 9/00812
  382/104

FOREIGN PATENT DOCUMENTS

| JP | 4278401 B2 | 6/2009 |
| JP | 2010-023836 A1 | 2/2010 |
| JP | 2011-225189 A | 11/2011 |
| JP | 4986268 B2 | 7/2012 |
| JP | 2012-188057 A1 | 10/2012 |
| JP | 2015-006820 A1 | 1/2015 |

* cited by examiner

D=Ds

D=Drs

T=Tc

VEHICLE DISPLAY CONTROL DEVICE AND VEHICLE DISPLAY CONTROL METHOD

CROSS REFERENCE TO RELATED APPLICATION

This application is based on Japanese Patent Application No. 2015-023616 filed on Feb. 9, 2015, the disclosure of which is incorporated herein by reference.

TECHNICAL FIELD

The present disclosure relates to a vehicle display control device and a vehicle display control method.

BACKGROUND ART

Conventionally, a vehicle display control technology for controlling display operation on a display unit equipped to a vehicle has been widely known.

For example, in a vehicle display control technology disclosed in Patent Literature 1, with detection of an opening command from a user of a vehicle, an opening image is displayed on the display unit during an opening period when the opening command is detected. In this example, the opening image to be displayed on the display unit is intended to act for welcoming the user, and is stored in an image storage unit in advance so as to be read and displayed during the opening period.

In addition, in the vehicle display control technology disclosed in Patent Literature 2, an external obstacle is detected by multiple external sensors equipped to a vehicle, and a notification corresponding to a distance to the obstacle from the vehicle is implemented by a change in a sound. According to such a notification, a safety system using those external sensors can improve the effect of mitigating or avoiding collision damage. Thus, the safety system can secure the safety and security of the user.

PRIOR ART LITERATURES

Patent Literatures

Patent Literature 1: Japanese Patent No. 4986268
Patent Literature 2: Japanese Patent No. 4278401

SUMMARY OF INVENTION

In order to further enhance the effect of mitigating or avoiding the collision damage, it is important for the user to understand the functions, performance and limitations of multiple external sensors disclosed in Patent Literature 2 before driving the vehicle. However, it is difficult to directly and visually recognize and experience the function of detecting the obstacle by each of the external sensors. Thus, it is difficult for the user to intuitively understand the detecting function in combination with the advancement of the safety technology in recent years. Further, the performance and limitation of each external sensor cannot be accurately grasped unless the user carefully reads an instruction manual of the vehicle and a driving scene in which the safety system operates appears actually. For these reasons, the user has a difficulty in accurately understanding the performance and limitation of each external sensor.

Under the above-described circumstances, the inventors of the present disclosure have keenly studied a technology for supporting user's understanding of the functions, capabilities, and limitations of those respective external sensors by displaying sensor information of the respective external sensors during the opening period as disclosed in Patent Literature 1.

The present disclosure has been created as a result of such keen research and it is an object of the present disclosure to provide a vehicle display control device and a vehicle display control method each of which contributes to an mitigation or avoidance of the collision damage by supporting the user's understanding of multiple vehicle external sensors equipped to a vehicle.

According to an aspect of the present disclosure, a vehicle display control device, which controls a display of sensor information on a display unit of a vehicle corresponding to each of a plurality of external sensors, includes an opening detection unit, an image storage unit, and an opening control unit. The vehicle is equipped with the display unit and the plurality of external sensors each of which detects an obstacle existing outside of the vehicle. The opening detection unit detects an opening command made by a user to the vehicle. The image storage unit stores a vehicle image indicating the vehicle and a plurality of area images indicating a plurality of detection areas of the plurality of external sensors in association with the vehicle image, the obstacle is detectable within the plurality of detection areas. The opening control unit reads, in response to a detection of the opening command by the opening detection unit, the vehicle image and each of the plurality of area images from the image storage unit, and displays the vehicle image and each of the plurality of area images on the display unit as the sensor information during an opening period.

According to another aspect of the present disclosure, a vehicle display control method of controlling a display of sensor information on a display unit of a vehicle corresponding to each of a plurality of external sensors is provided. The vehicle is equipped with the display unit and the plurality of external sensors each of which detects an obstacle existing outside of the vehicle. The vehicle display control method comprising: detecting an opening command made by a user to the vehicle; in response to a detection of the opening command, reading, from an image storage unit that stores a vehicle image indicating the vehicle and a plurality of area images indicating a plurality of detection areas of the plurality of external sensors in association with the vehicle image, the vehicle image and the plurality of area images, wherein the obstacle is detectable within the plurality of detection areas; and displaying the vehicle image and each of the plurality of area images which are read from the image storage unit on the display unit as the sensor information during an opening period.

According to the above vehicle display control device and the vehicle display control method, during the opening period set in response to the detection of the opening command made by the user to the vehicle, the images read from the image storage unit are displayed as the sensor information on the display unit. In the display, the area images indicating the detection areas in which the obstacle is detectable by each of the external sensors are associated with the vehicle image indicating the vehicle. Therefore, the user can intuitively grasp and understand the function, performance and limitation of each external sensor from the display of the area image of each external sensor associated with the vehicle image. According to the above configuration, since the user can have further understanding about each of the external sensors, the above device and method can contribute to the mitigation or avoidance of collision damage.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, description will be given for multiple embodiments of the present disclosure based on the drawings. The same reference symbols are assigned to the corresponding elements in each embodiment, and overlapping descriptions thereof may be omitted. When only a portion of a configuration in each embodiment is described, configurations of other embodiments described in advance can be applied to the remaining portion. In addition to the combinations of configurations clearly depicted in the explanation of each embodiment, as long as problems do not particularly arise in a combination, the configurations of multiple embodiments may be partially or entirely combined with each other, even when not clearly described.

First Embodiment

Figure 1:
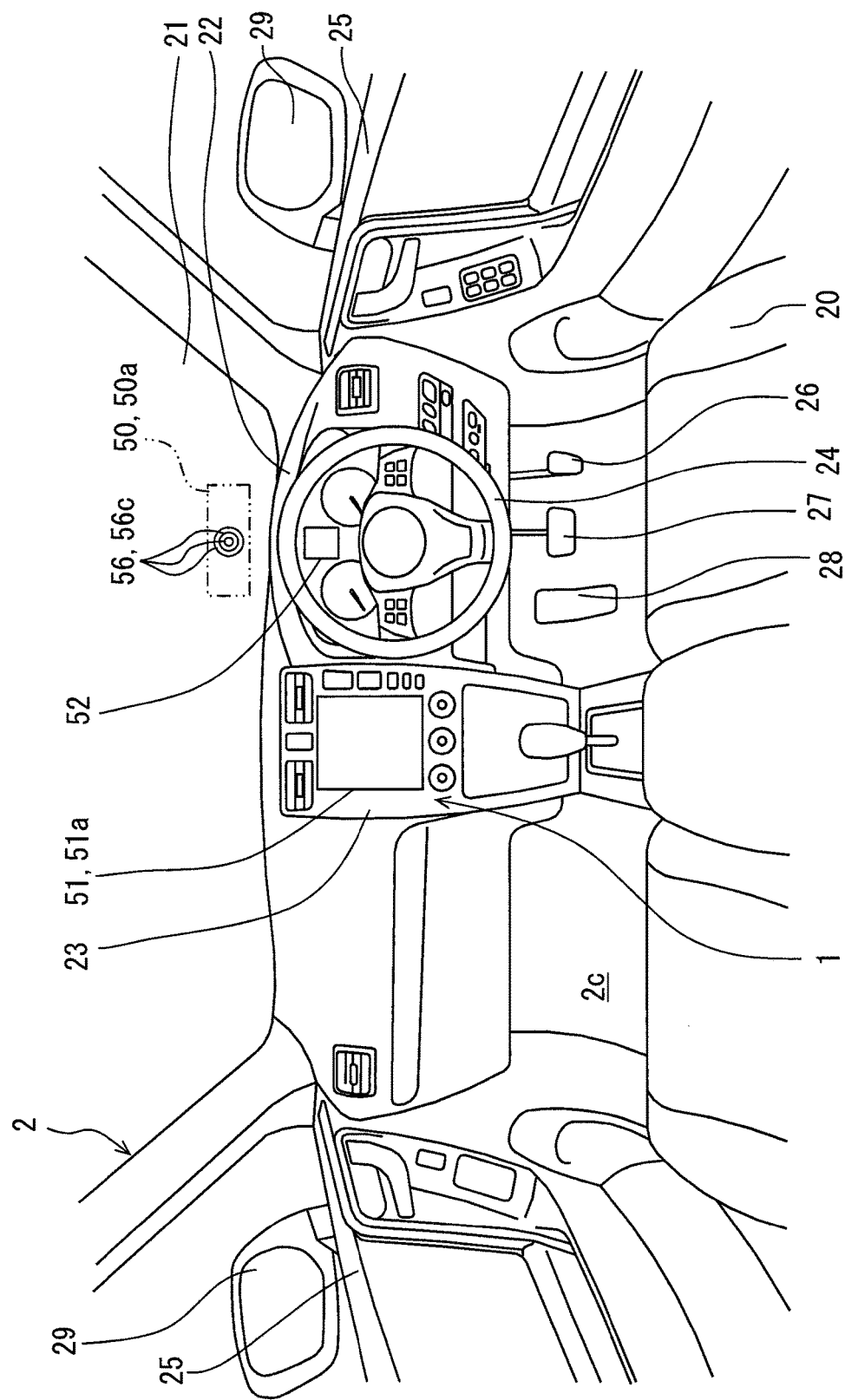
FIG. 1 is a diagram illustrating a compartment of a vehicle equipped with a travel assist system according to a first embodiment of the present disclosure.
Figure 2:
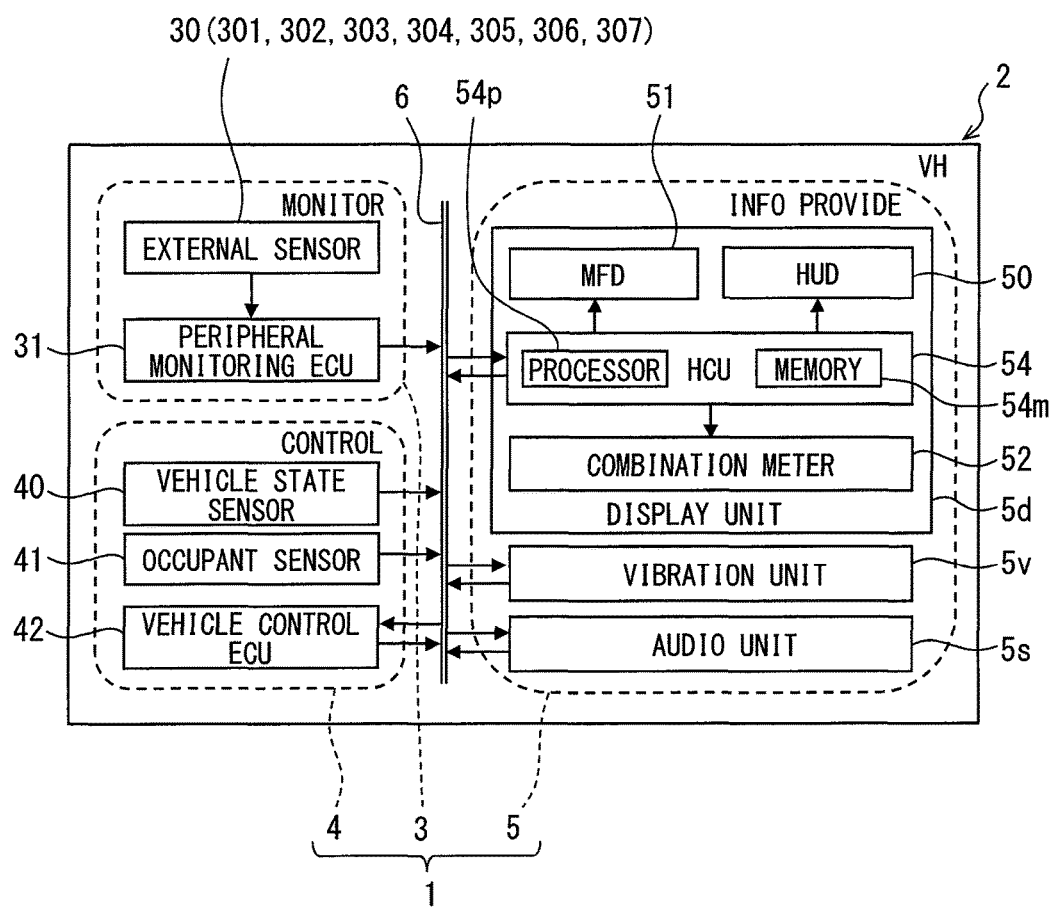
FIG. 2 is a block diagram illustrating a travel assist system according to the first embodiment.

A travel assist system (ASSIST) 1 according to a first embodiment of the present disclosure is equipped to a vehicle (VH) 2 as illustrated in FIG. 1 and FIG. 2. In the following description, a speed at which the vehicle 2 travels is referred to as a vehicle speed, a road on which the vehicle 2 travels is referred to as a traveling road, and a vehicle speed limited for the vehicle 2 on the traveling road is referred to as a speed limit.

As illustrated in FIG. 2, the travel assist system 1 includes a periphery monitoring system (MONITOR) 3, a vehicle control system (CONTROL) 4, and an information providing system (INFO PROVIDE) 5. The respective systems 3, 4, and 5 of the travel assist system 1 are connected to each other through an in-vehicle network 6 such as a LAN (local area network).

Figure 3:
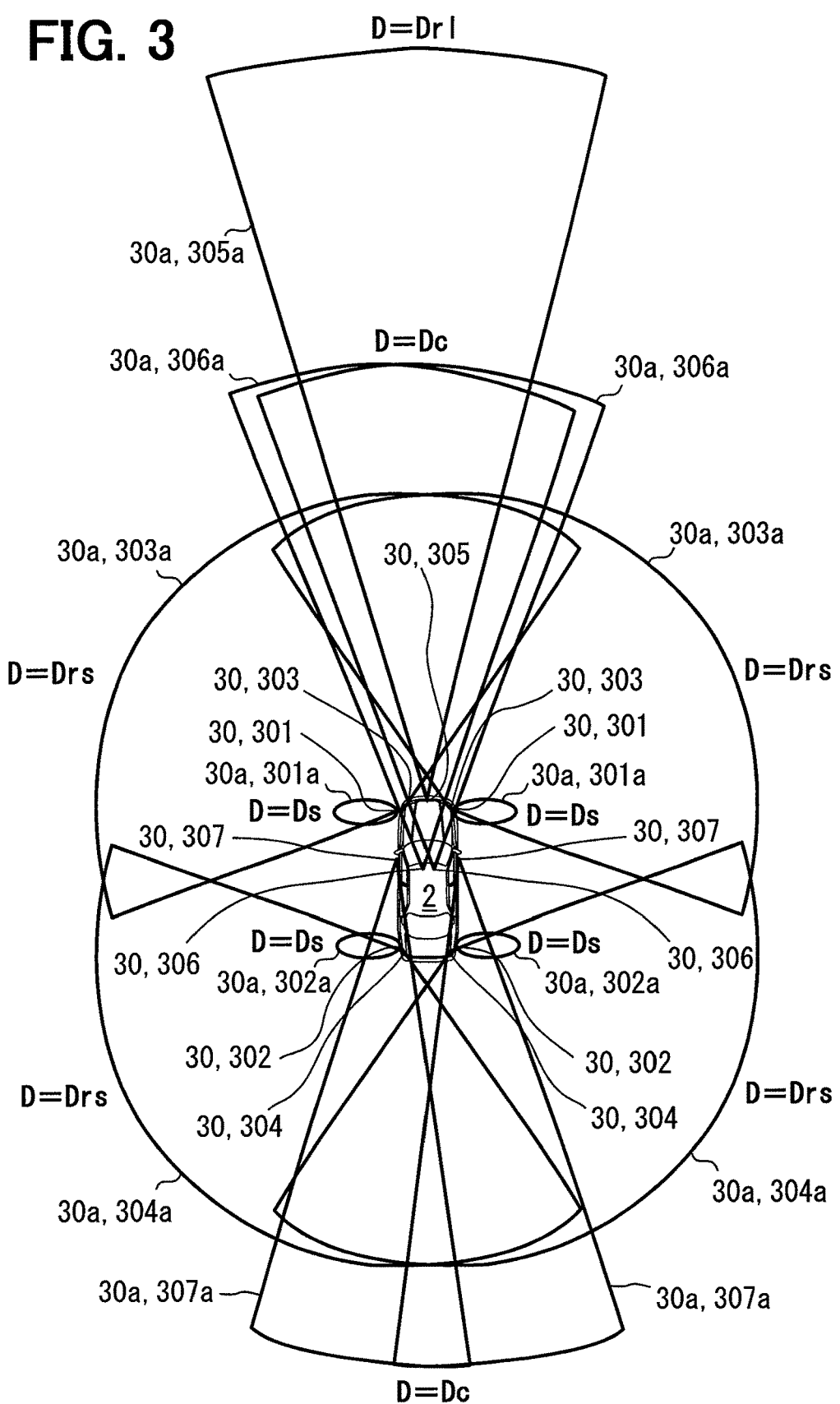
FIG. 3 is a schematic top view illustrating multiple external sensors shown in FIG. 2.

The periphery monitoring system 3 includes an external sensor 30 and a periphery monitoring ECU (electronic control unit) 31. The external sensor 30 detects an obstacle that exists outside of the vehicle 2 and may collide with the vehicle 2, such as periphery vehicles, artificial structures, pedestrians, animals, and traffic indications existing outside of the vehicle. As illustrated in FIG. 2 and FIG. 3, sonars 301, 302, radars 303, 304, 305 and cameras 306, 307 are equipped to the vehicle 2 as the external sensor 30.

As illustrated in FIG. 3, the front lateral sonars 301 are ultrasonic sensors attached respectively to both of the left and right sides of a front portion of the vehicle 2. Each of the front lateral sonars 301 detects the obstacle in a detection area 301a upon receiving a reflected wave of a ultrasonic wave transmitted to the detection area 301a on a front lateral side of the outside of the vehicle 2, and outputs a detection signal. In this example, the detection area 301a detectable by each of the front lateral sonars 301 is set with a maximum detection distance Ds of, for example, about 2 meters. The detection distance is a distance from an attachment position of the sonar 301 on the vehicle 2 to the obstacle to be detected.

The rear lateral sonars 302 are ultrasonic sensors attached respectively to both of the left and right sides of a rear portion of the vehicle 2. Each of the rear lateral sonars 302 detects the obstacle in a detection area 302a upon receiving a reflected wave of the ultrasonic wave transmitted to the detection area 302a on a rear lateral side of the outside of the vehicle 2, and outputs a detection signal. In this example, the detection area 302a detectable by each of the rear lateral sonars 302 is set with a maximum detection distance Ds of, for example, about 2 meters. The detection distance is a distance from the attachment position of the sonar 302 on the vehicle 2 to the obstacle to be detected.

The front short distance millimeter wave radars 303 are millimeter wave sensors attached respectively to both of the left and right sides of the front portion of the vehicle 2. Each of the front short distance millimeter wave radars 303 receives a reflected wave of a millimeter wave or a quasi-millimeter wave transmitted to a front detection area 303a of the outside of the vehicle 2 to detect the obstacle in the area 303a, and outputs a detection signal. In this example, the detection area 303a detectable by each of the front short distance millimeter wave radars 303 is set with a maximum detection distance Drs of, for example, about 40 meters. The detection distance is a distance from the attachment position of the radar 303 on the vehicle 2 to the obstacle to be detected.

The rear short distance millimeter wave radars 304 are millimeter wave sensors attached respectively to both of the left and right sides of the rear portion of the vehicle 2. Each of the rear short distance millimeter wave radars 304 receives a reflected wave of a millimeter wave or a quasi-millimeter wave transmitted to a rear detection area 304a of the outside of the vehicle 2 to detect the obstacle in the area 304a, and outputs a detection signal. In this example, the detection area 304a detectable by each of the rear short distance millimeter wave radars 304 is set with a maximum detection distance Drs of, for example, about 40 meters. The detection distance is a distance from the attachment position of the radar 304 on the vehicle 2 to the obstacle to be detected.

The long distance millimeter wave radar 305 is a millimeter wave sensor attached to a center of the front portion of the vehicle 2. The long distance millimeter wave radar 305 receives a reflected wave of a millimeter wave transmitted to a front detection area 305a of the outside of the vehicle 2 to detect the obstacle in the area 305a, and outputs a detection signal. In this example, the detection area 305a detectable by the long distance millimeter wave radar 305 is set with a maximum detection distance Drl of, for example, about 70 meters to 150 meters. The detection distance is a distance from the attachment position of the radar 305 on the vehicle 2 to the obstacle to be detected.

The paired front cameras 306 are provided by monocular or compound eye type cameras, and are attached to an inner rearview mirror disposed at the center of the vehicle compartment 2c of the vehicle 2. Each front camera 306 detects the obstacle or a traffic indication in the area 306a by imaging a front detection area 306a of the outside of the vehicle 2, and outputs an image signal. In this example, the detection area 306a detectable by each of the front cameras 306 is set with a maximum detection distance Dc of, for example, about 50 meters to 60 meters. The detection distance is a distance from an attachment position of each camera 306 on the vehicle 2 to the obstacle to be detected.

The rear cameras 307 also functioning as electronic mirrors are provided by monocular or compound eye type cameras which are attached to the respective left and right door mirrors 29 (refer to FIG. 1) of the vehicle 2. Each of the rear cameras 307 detects the obstacle in a detection area 307a by imaging the rear area 307a of the outside of the vehicle 2, and outputs an image signal. In this example, the detection area 307a detectable by each of the rear cameras 307 is set with a maximum detection distance Dc of, for example, about 50 meters to 60 meters. The detection distance is a distance from an attachment position of each camera 307 on the vehicle 2 to the obstacle to be detected.

As described above, in the present embodiment, the sonars 301, 302, the radars 303, 304, 305 and the cameras 306, 307 are collectively referred to as "external sensor 30". Also, the respective detection areas 301a, 302a, 303a, 304a, 305a, 306a, and 307a of the respective external sensors including the sonars 301, 302, the radars 303, 304, 305 and the cameras 306, 307 are collectively referred to as "detection area 30a". Further, the respective maximum detection distances Ds, Drs, Drl, Dc of the respective external sensors including the sonars 301, 302, the radars 303, 304, 305 and the cameras 306, 307 are collectively referred to as "maximum detection distance D". Under those generic terms, the maximum detection distance D of the detection area 30a for each of the external sensors 30 increases in an order of Ds, Drs, Dc, and Drl.

The periphery monitoring ECU 31 illustrated in FIG. 2 is mainly configured by a microcomputer having a processor and a memory, and is connected to the external sensor 30 and the in-vehicle network 6. The periphery monitoring ECU 31 acquires sign information such as a speed limit sign, a stop sign, an intersection sign, an entrance and exit sign, a tunnel sign, and a slope sign, and lane line information such as a white lane line and a yellow lane line based on the output signal of the external sensor 30. At the same time, the periphery monitoring ECU 31 acquires obstacle information such as the type of obstacle and a relative relationship of the obstacle to the vehicle 2, based on an output signal of the external sensor 30. In this example, the obstacle information, for example, an inter-vehicle distance, an inter-vehicle time, a relative speed, a predicted collision time relative to a preceding vehicle are acquired by the periphery monitoring ECU 31. Herein, the preceding vehicle is described as an example of a forward obstacle.

The vehicle control system 4 includes a vehicle state sensor 40, an occupant sensor 41, and a vehicle control ECU 42. The vehicle state sensor 40 is connected to the in-vehicle network 6. The vehicle state sensor 40 detects a traveling state of the vehicle 2. The vehicle state sensor 40 includes one type or multiple types of sensors, for example, a vehicle speed sensor, a rotation speed sensor, a fuel sensor, a water temperature sensor, a battery sensor, a radio wave receiver, and the like.

More specifically, the vehicle speed sensor detects the vehicle speed of the vehicle 2 and outputs a vehicle speed signal corresponding to the detected vehicle speed. The rotation speed sensor detects an engine speed of the vehicle 2 and outputs a rotation speed signal corresponding to the detected engine speed. The fuel sensor detects the remaining fuel amount in a fuel tank of the vehicle 2 and outputs a fuel signal corresponding to the detected remaining fuel amount. The water temperature sensor detects a coolant temperature of an internal combustion engine in the vehicle 2 and outputs a water temperature signal corresponding to the detected coolant temperature. The battery sensor detects the remaining battery charge of the vehicle 2 and outputs a battery signal corresponding to the detected remaining battery charge. The radio wave receiver receives output radio waves from, for example, positioning satellites, periphery vehicle transmitters supporting an inter-vehicle communication, roadside equipment supporting a road-to-vehicle communication, and the like, and outputs a traffic signal. In this example, the traffic signal is a signal indicative of traffic information related to the vehicle 2, such as a traveling position, a traveling direction, a traveling time, a traveling road condition, and a speed limit, and the above obstacle information.

The occupant sensor 41 is connected to the in-vehicle network 6. The occupant sensor 41 detects a state or operation of a user who has entered the vehicle compartment 2c of the vehicle 2 illustrated in FIG. 1. The occupant sensor 41 includes one or more types among, for example, a power switch, a user state monitor, a seating sensor, a door sensor, a display setting switch, a light switch, a turn switch, and the like.

More specifically, the power switch is turned on by the user in the vehicle compartment 2c in order to start the internal combustion engine or the electric motor of the vehicle 2, and outputs a power signal corresponding to the operation made by the occupant. The user state monitor takes images of a user state on the driver's seat 20 in the vehicle compartment 2c by the aid of an image sensor, and detects the user state and outputs an image signal. The seating sensor detects the seating motion of the user in the driver's seat 20 in the vehicle compartment 2c, and outputs a seating signal corresponding to the detection. The door sensor detects the opening operation made by the user from the outside of the vehicle compartment 2c on a door 25 of the vehicle 2 close to the driver's seat 20, and outputs a door signal corresponding to the detection.

The display setting switch is operated by the user in order to set the display state in the vehicle compartment 2c, and outputs a display setting signal corresponding to the operation. The light switch is turned on by the user in the vehicle compartment 2c in order to turn on various lights of the vehicle 2, and outputs a light signal corresponding to the operation. The turn switch is turned on by the user in the vehicle compartment 2c in order to operate a direction indicator of the vehicle 2, and outputs a turn signal corresponding to the operation.

The vehicle control ECU 42 illustrated in FIG. 2 is mainly configured by a microcomputer having a processor and a memory, and is connected to the in-vehicle network 6. The vehicle control ECU 42 may be a single type ECU including an integrated control ECU. Alternatively, the vehicle control ECU 42 may include multiple ECUs, such as an engine control ECU, a motor control ECU, a brake control ECU, in addition to the integrated control ECU.

More specifically, the engine control ECU controls the operation of a throttle actuator of an engine and a fuel injection valve according to the operation of an accelerator pedal 26 (refer to FIG. 1), or automatically controls the throttle actuator of an engine and a fuel injection valve to accelerate or decelerate a vehicle speed of the vehicle 2. The motor control ECU controls the operation of a motor generator according to the operation of the accelerator pedal 26, or automatically controls the operation of a motor generator to accelerate or decelerate the vehicle speed of the vehicle 2. The brake control ECU controls the operation of a brake actuator according to the operation of a brake pedal 27 (refer to FIG. 1), or automatically controls the operation of a brake actuator to accelerate or decelerate the vehicle speed of the vehicle 2.

The integrated control ECU synchronously controls the operation of the other control ECUs based on, for example, output signals from the sensors 40 and 41, information acquired by the periphery monitoring ECU 31, control information from another control ECU functioning as the vehicle control ECU 42, and the like. In particular, the integrated control ECU according to the present embodiment outputs a control command to another control ECU functioning as the vehicle control ECU 42 in order to automatically mitigate or avoid the collision damage of the vehicle 2 against a forward obstacle such as a preceding vehicle traveling in the same direction. In this situation, when an emergency control condition is satisfied, the integrated control ECU forcibly automatically decelerates the vehicle speed of the vehicle 2 to perform a collision damage mitigation braking (AEB: autonomous emergency braking). In this case, the emergency control condition of the AEB is satisfied when a predicted time until collision occurrence between the vehicle 2 and the preceding vehicle decreases to, for example, 5 seconds or less.

The information providing system 5 includes an audio unit 5s, a vibration unit 5v, and a display unit 5d.

The audio unit 5s is equipped to the vehicle 2 for providing information in audio manner. The audio unit 5s is mainly configured by a speaker and a sound source circuit, and is connected to the in-vehicle network 6. The audio unit 5s is attached to one or more portions among, for example, the driver's seat 20, the instrument panel 22, and the door 25 in the vehicle compartment 2c of the vehicle 2 illustrated in FIG. 1. The audio unit 5s generates informative sound waves perceptible by the user on the driver's seat 20, or generates notification sounds.

The vibration unit 5v illustrated in FIG. 2 is equipped to the vehicle 2 in order to provide information in a tactile sense. The vibration unit 5v is mainly configured by a vibration actuator and is connected to the in-vehicle network 6. The vibration unit 5v is attached to one or more portions among, for example, the driver's seat 20, a steering wheel 24, an accelerator pedal 26, a brake pedal 27, and a footrest 28 in the vehicle compartment 2c illustrated in FIG. 1, and generates a notification vibration perceptible by the user on the driver's seat 20.

The display unit 5d illustrated in FIG. 2 is equipped to the vehicle 2 for visually providing information. The display unit 5d includes a head-up display (HUD) 50, a multi-function display (MFD) 51, a combination meter 52, and an HCU (human machine interface (HMI)) control unit 54.

Figure 4:
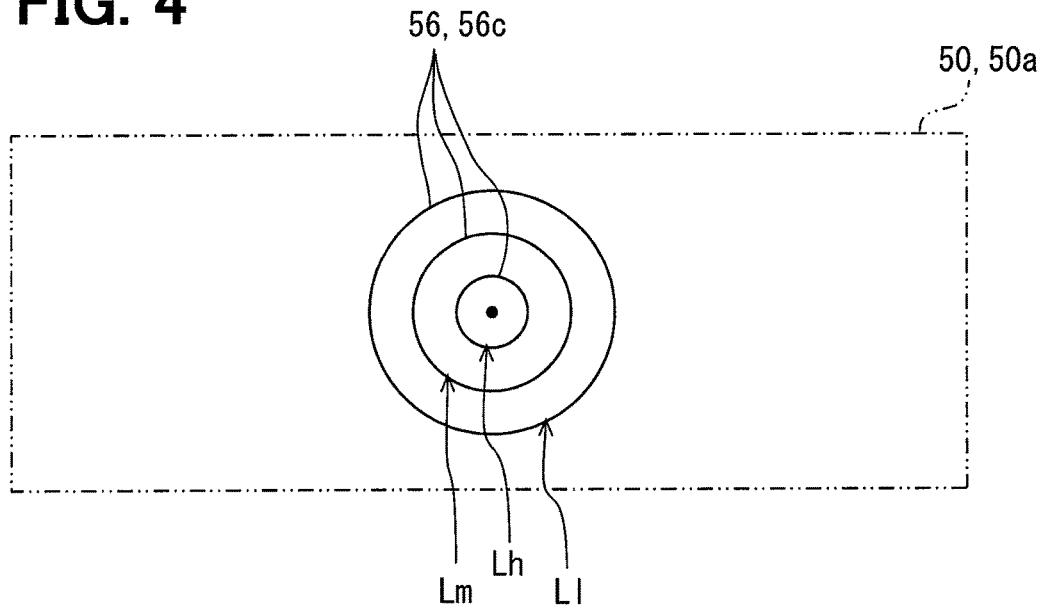
FIG. 4 is a front view illustrating one display state of an HUD shown in FIG. 1.
Figure 5:
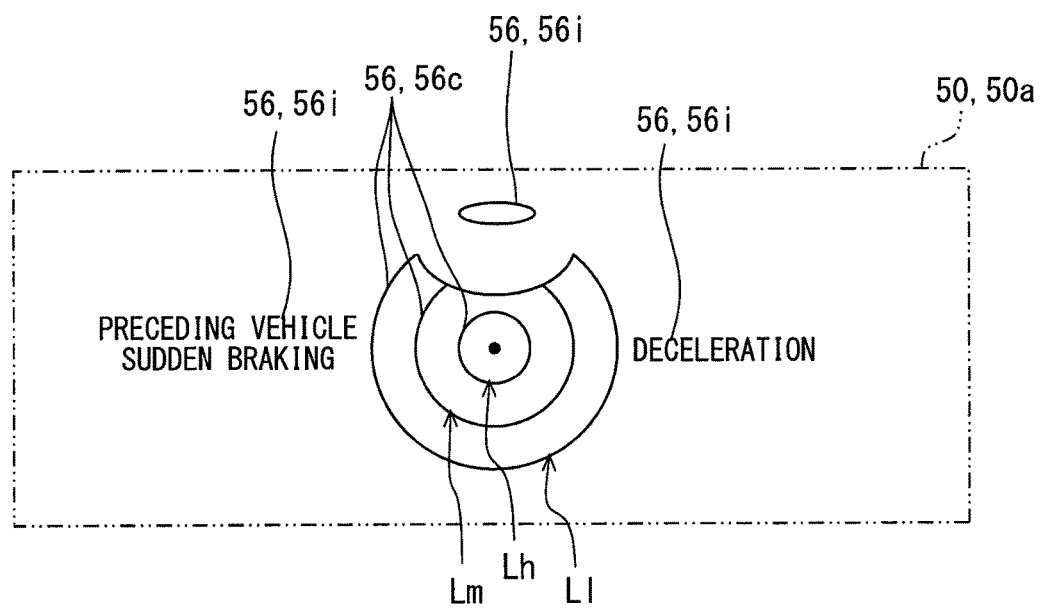
FIG. 5 is a front view illustrating one display state of the HUD shown in FIG. 1.

The HUD 50 is attached to the instrument panel 22 in the vehicle compartment 2c illustrated in FIG. 1. The HUD 50 projects an image 56, which indicates predetermined information and is displayed on a liquid crystal panel or a projection screen, toward a windshield 21 of the vehicle 2 so that a virtual image of the image 56 can be displayed to be visually recognizable by the user on the driver's seat 20. A virtual image display executed by the HUD 50 overlaps with an external scenery ahead of the vehicle 2 in a display range 50a of a predetermined area, which is a projection range of the image 56 on the windshield 21, and is visually recognized by the user. As the virtual image display executed by the HUD 50, a caution image 56c and a notification image 56i may be displayed as illustrated in FIG. 2, FIG. 4, and FIG. 5. Further, as the virtual image display executed by the HUD 50, in addition to the images 56c and 56i, image display showing one type or plural types of information among, for example, navigation information, sign information, obstacle information, and so on may be displayed. With the use of a combiner, which is disposed on the instrument panel 22 and transmits the external scenery in cooperation with the windshield 21, the virtual image display can also be implemented by projecting the image 56 on the combiner. Further, the navigation information described above can be acquired based on map information stored in the memory 54m and an output signal from the sensor 40, for example, in the HCU 54 to be described in detail later.

The MFD 51 is attached to the center console 23 in the vehicle compartment 2c illustrated in FIG. 1. The MFD 51 displays a real image of the image 56 indicating predetermined information on one or more liquid crystal panels so as to be visually recognized by the user on the driver's seat 20. The real image display executed by the MFD 51 is visually recognized by the user in the display range 51a having an area larger than that of the display range 50a of the HUD 50. As the real image display executed by the MFD 51, the vehicle image 56s, the area image 56a, the caution image 56c, and the notification image 56i as illustrated in FIG. 4 to FIG. 10 may be displayed. In addition to the images 56s, 56a, 56c, and 56i, as the real image display executed by the MFD 51, image that showing one type or plural types of information among navigation information, audio information, video information, communication information, and so on may be displayed.

The combination meter 52 is attached to the instrument panel 22 in the vehicle compartment 2c illustrated in FIG. 1. The combination meter 52 displays vehicle information on the vehicle 2 so that the user on the driver's seat 20 can visually recognize the vehicle information. The combination meter 52 is a digital meter that displays vehicle information using an image formed on the liquid crystal panel, or an analog meter that displays vehicle information using a scale with a pointer. As the display executed by the combination meter 52, one or more types of information among, for example, the vehicle speed, the engine speed, the remaining fuel amount, the coolant temperature, the battery remaining amount, the light switch, the turn switch, the operating state of the door 25, and so on may be displayed.

The HCU 54 is mainly configured by a microcomputer having a processor 54p and a memory 54m, and is connected to display elements 50, 51, and 52 of the display unit 5d and the in-vehicle network 6. The HCU 54 synchronously controls the operation of the audio unit 5s and the vibration unit 5v as well as the operation of the display elements 50, 51, and 52 of the display unit 5d. In this situation, based on, for example, output signals of the sensors 40 and 41, information acquired by the ECU 31, control information in the ECU 42, information stored in the memory 54m, and acquired information including time keeping information of the HCU 54 itself, the HCU 54 controls the operation of the audio unit 5s, the vibration unit 5v, and the display elements 50, 51, and 52 of the display unit 5d. Incidentally, the memory 54m of the HCU 54 and the memories of other various ECUs are respectively configured with the use of one or more storage media such as a semiconductor memory, a magnetic medium, or an optical medium.

More particularly, in the present embodiment, the HCU 54 functions as a "vehicle display control device" by storing the images 56s, 56a, 56c, and 56i, which function as data, in the memory 54m, which functions as the "image storage unit". With this function, the HCU 54 controls the virtual image display of the images 56c, and 56i in the HUD 50 and controls the real image display of the images 56s, 56a, 56c, and 56i in the MFD 51. The virtual image display of the images 56c, and 56i and the real image display of the images 56s, 56a, 56c, and 56i correspond to sensor information display executed by each of the external sensors 30, which will be described below in detail. It should be noted that the "image storage unit" for storing the images 56s, 56a, 56c, and 56i may be implemented by any one of the memories of the built-in ECUs of the display devices 50, 51, and 52, or the cooperation of the multiple memories among those respective memories and the memory 54m of the HCU 54.

Figure 11:
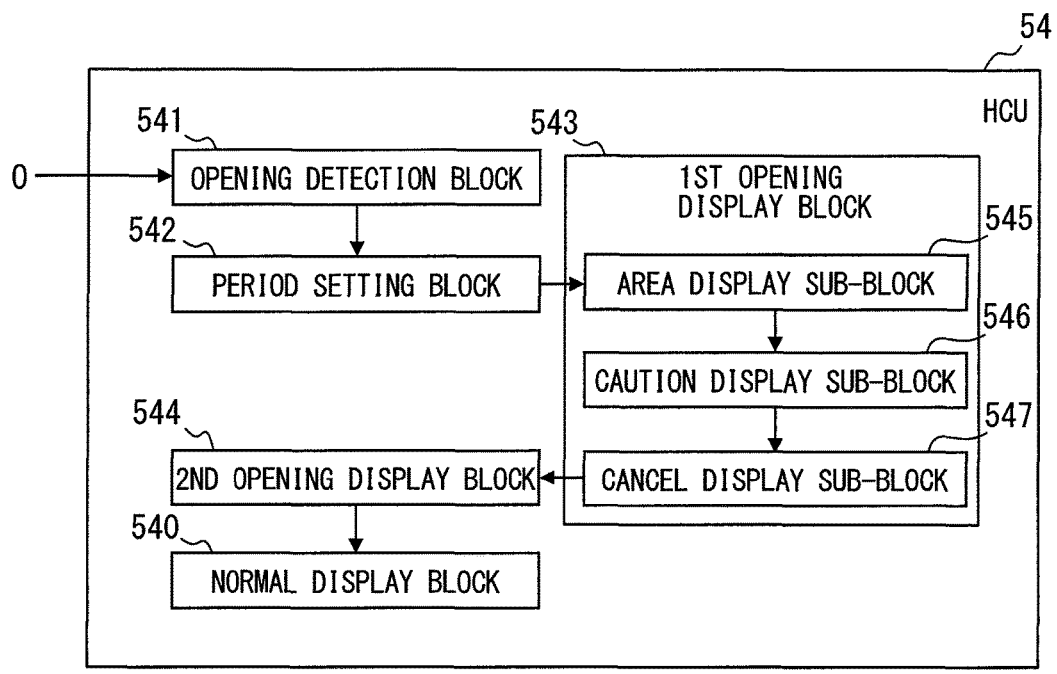
FIG. 11 is a block diagram illustrating blocks included in the HCU shown in FIG. 2.

The HCU 54 executes a vehicle display control program stored in the memory 54m using the processor 54p, to thereby functionally configure multiple blocks 541, 542, 543, 544, and 540 as illustrated in FIG. 11. At least a part of those blocks 541, 542, 543, 544, and 540 may be configured by hardware using one or more ICs or the like.

An opening detection block 541 functioning as an "opening detection unit" detects an opening command O from the user of the vehicle 2. In this example, the opening command O represents a user's intention to start driving of the vehicle 2, and is detected based on an output signal from the occupant sensor 41. The opening command O may include a power on operation detected based on a power signal from the power switch, an opening operation detected based on a door signal from the door sensor, a seating motion detected based on a seating signal from the seating sensor, or an image signal of the user state monitor, or the like.

A period setting block 542 functioning as an "opening control unit" sets an opening period Po (refer to FIG. 12) in response to a detection of the opening command O by the opening detection block 541. In this example, the opening period Po is started immediately after the opening command O has been detected or is started after a set duration has elapsed from the detection time of the opening command O. Further, a duration of the opening period Po is set to, for example, about 5 to 10 seconds according to a display control content in the display blocks 543 and 544 to be described in detail later so that the images 56s, 56a, 56c, and 56i can be visually recognized by the user on the driver's seat 20.

During the opening period Po set by the period setting block 542, display blocks 543 and 544 functioning as "opening control unit" sequentially execute individual opening display modes Mo1 and Mo2 (refer to FIG. 12), respectively. The first opening display block 543 includes multiple sub-blocks 545, 546, and 547.

Figure 6:
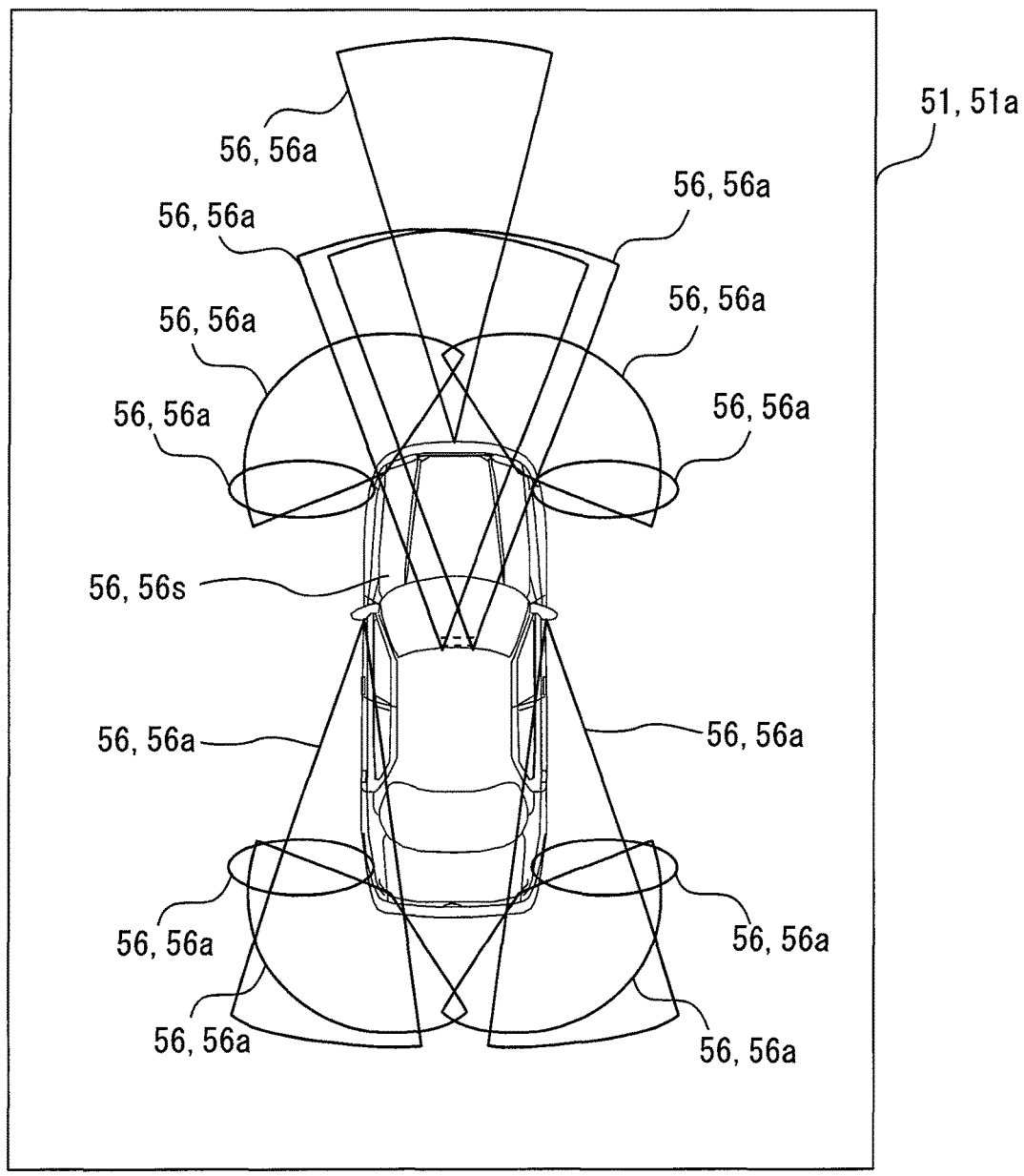
FIG. 6 is a front view illustrating one display state of the MFD shown in FIG. 1.
Figure 7A:
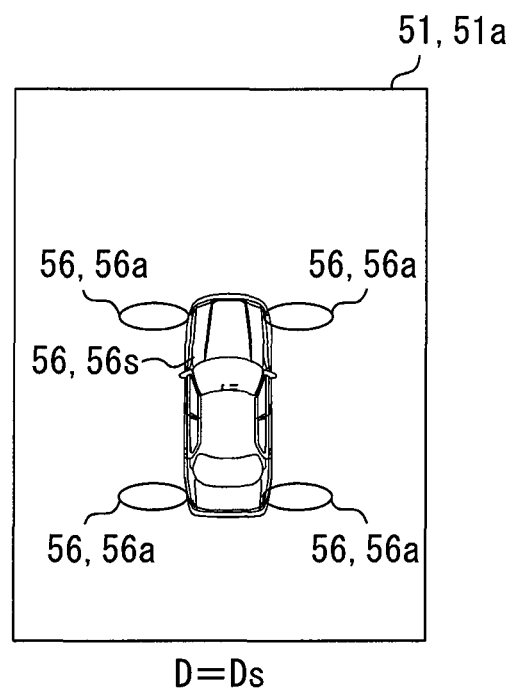
FIG. 7A is a diagram for schematically illustrating a display performed by an MFD shown in FIG. 1.
Figure 7B:
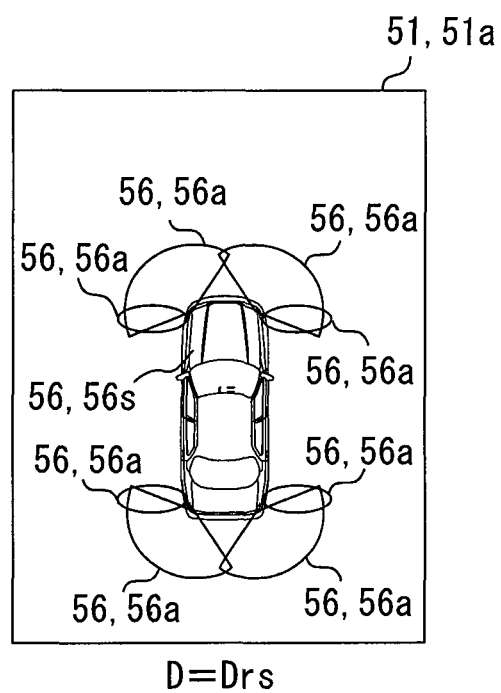
FIG. 7B is a diagram for schematically illustrating the display performed by the MFD subsequent to FIG. 7A.
Figure 7C:
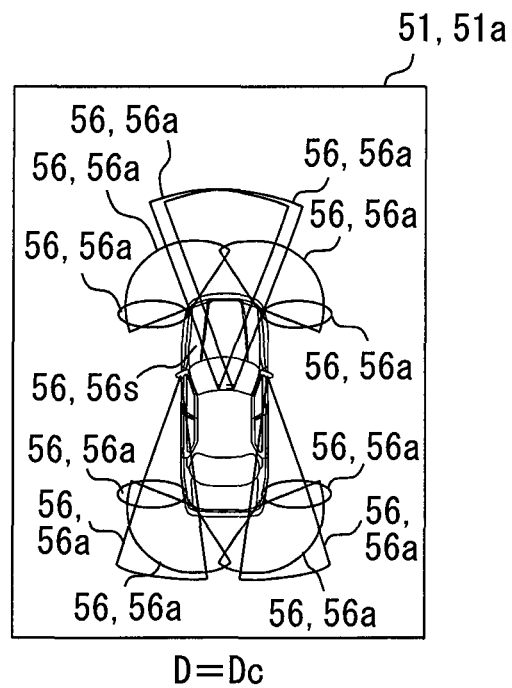
FIG. 7C is a diagram for schematically illustrating the display performed by the MFD subsequent to FIG. 7B.
Figure 7D:
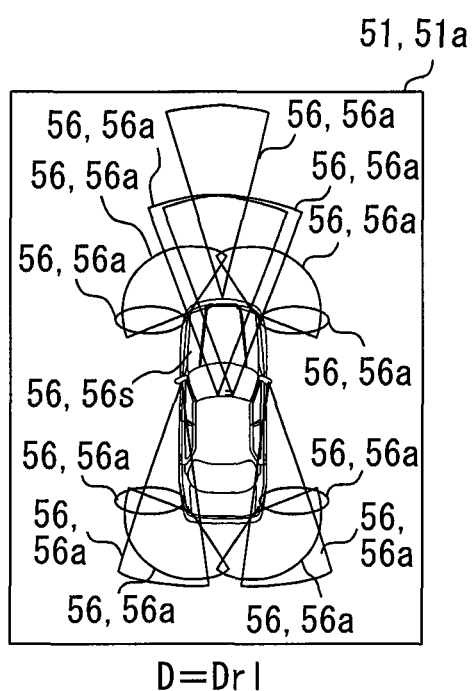
FIG. 7D is a diagram for schematically illustrating the display performed by the MFD subsequent to FIG. 7C.

The area display sub-block 545 reads out the vehicle image 56s and multiple area images 56a from the memory 54m, and controls the MFD 51 to display the vehicle image 56s and multiple area images 56a as illustrated in FIG. 6. The vehicle image 56s is a graphic image schematically illustrating a top view of the vehicle 2. In addition, each area image 56a is a graphic image schematically illustrating the detection area 30a (refer to FIG. 3) of corresponding external sensor 30. Display colors of the respective area images 56a may be the same as each other, or may be different from each other. Further, a distance from the vehicle image 56s to the most distant portion of the outer contour lines of the respective area images 56a indicates the maximum detection distance D (refer to FIG. 3) of the corresponding detection area 30a in viewable manner. However, as illustrated in FIG. 3 and FIG. 6, a ratio of the distances from the vehicle image 56s to the most distant portions of the outer contour lines of the area images 56a is different from a ratio of the maximum detection distances D of the corresponding detection areas 30a due to the convenience of a display size.

Figure 8:
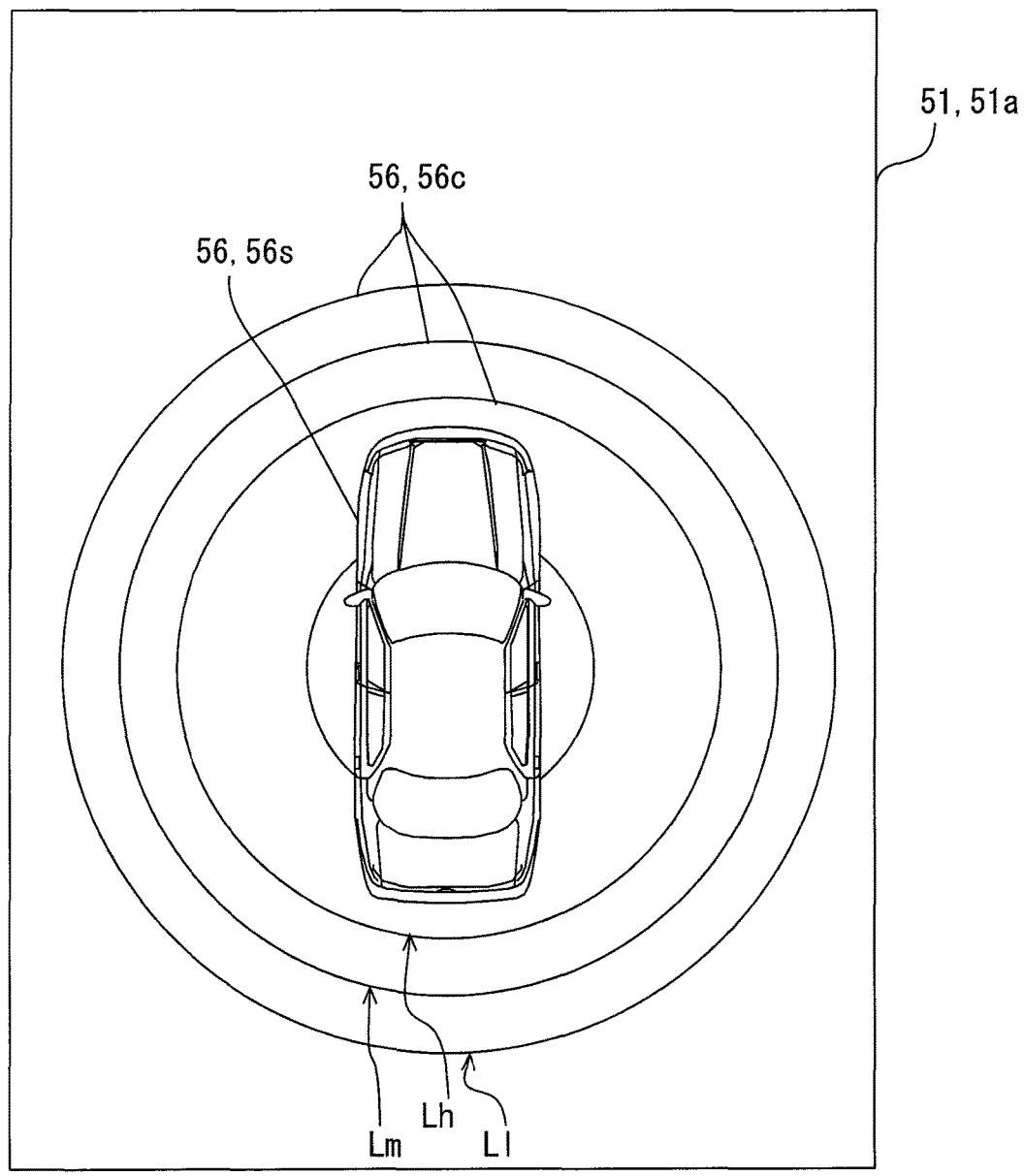
FIG. 8 is a front view illustrating one display state of the MFD shown in FIG. 1.

As described above, the area display sub-block 545 sequentially displays each area image 56a in the display range 51a of the MFD 51 in order from the external sensor 30 having the shortest maximum detection distance D to the external sensor 30 having the longest maximum detection distance D as illustrated in FIG. 7A to FIG. 7D. In the present embodiment, the area display sub-block 545 displays, in an overlapped manner, the corresponding area image 56a on the vehicle image 56s in the stated order of the sonar 301 and 302 of Ds illustrated in FIG. 7A, the short distance millimeter wave radars 303 and 304 of Drs illustrated in FIG. 7B, the cameras 306 and 307 of Dc illustrated in FIG. 7C, and the long distance millimeter wave radar 305 of Dr1 illustrated in FIG. 7D. As a result, the area display sub-block 545 displays each of the area images 56a in association with the vehicle image 56s on the MFD 51 during a display control period, which is set as a part of the opening period Po, as illustrated in FIG. 6, A caution display sub-block 546 illustrated in FIG. 11 switches the area images 56a on the MFD 51 to multiple caution images 56c, which are read out from the memory 54m, after the display control period of the area display sub-block 545, which is included in the opening period Po, has elapsed as illustrated in FIG. 8. Each of the caution images 56c represents a graphical image schematically illustrating a corresponding caution levels Ll, Lh, or Lm. Each caution level indicates a risk level relying on a distance (hereinafter simply referred to as "obstacle distance") from the vehicle 2 to an obstacle, and this risk level is used as a driving risk of the vehicle 2.

More specifically, the caution image 56c indicating the caution level Ll when the driving risk is low is a circle having a maximum radius of the outer contour line around the vehicle image 56s. The caution image 56c indicating the caution level Lh when the driving risk is high is a circle having a minimum radius of the outer contour line around the vehicle image 56s. The caution image 56c indicating the caution level Lm when the driving risk is medium is a circle having the radius of the outer contour line around the vehicle image 56s between the minimum diameter and the maximum diameter. The radius of the outer contour line of each caution image 56c represents association between the detection areas 30a indicated by the images 56a before display switch and the obstacle distance from the vehicle 2 in viewable manner as illustrated in FIG. 6. In the following description, the caution levels Ll, Lh, and Lm are collectively referred to as "caution level L".

As described above, the caution display sub-block 546 displays each of the caution images 56c switched from the area image 56a in the display range 51a of the MFD 51 in association with the vehicle image 56s as illustrated in FIG. 8. In the present embodiment, those images 56a and 56c are animated as a moving image in which each of the caution images 56c fades in at each display portion while each of the area images 56a fades out at each display portion. In the above configuration, the caution display sub-block 546 remains the vehicle image 56s, and changes the image associated with the vehicle image 56s from the area image 56a to the caution image 56c on the MFD 51 during a display control period, which is set as a part of the opening period Po by the caution display sub-block 546.

Figure 9:
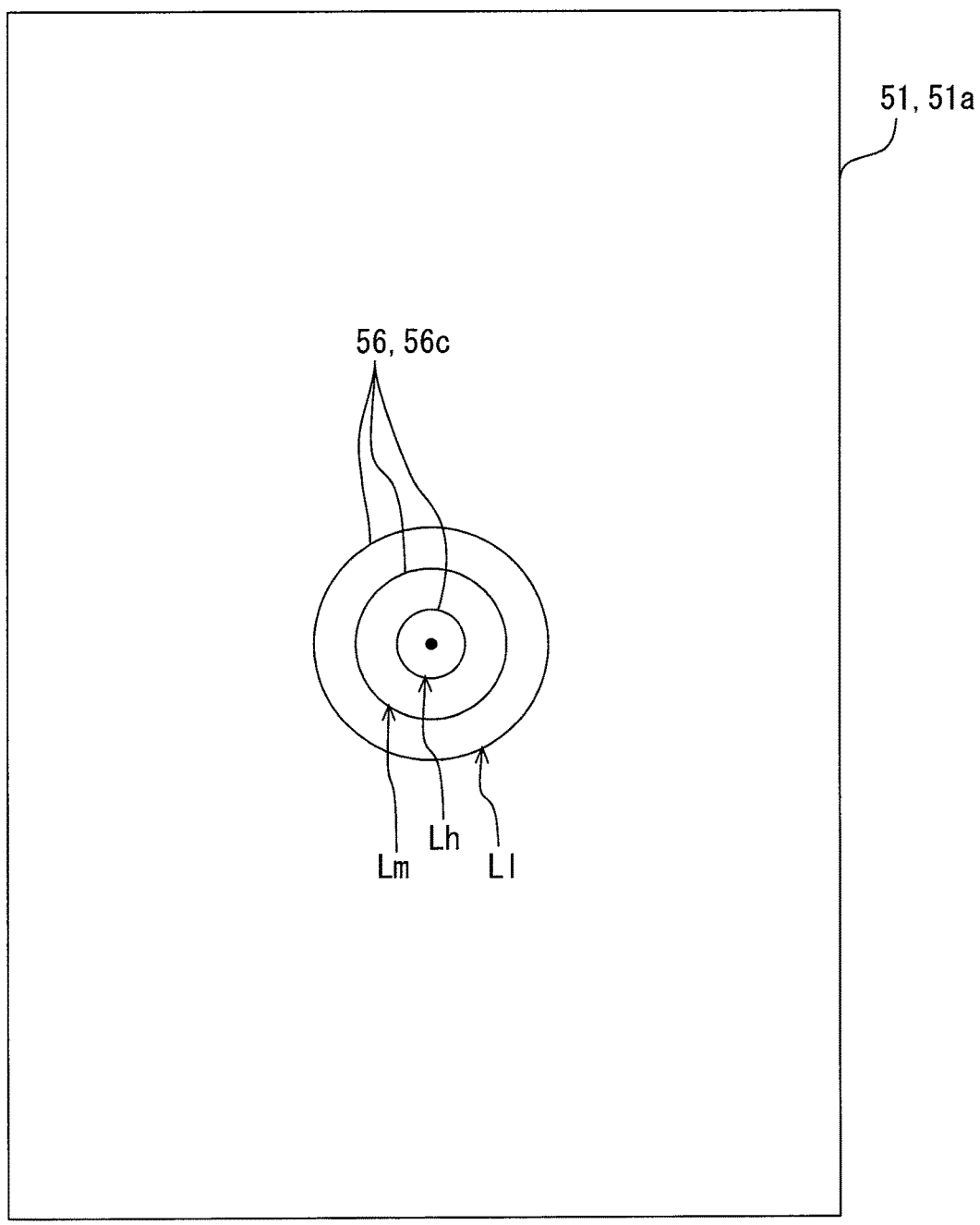
FIG. 9 is a front view illustrating one display state of the MFD shown in FIG. 1.

A cancel display sub-block 547 illustrated in FIG. 11 controls the MFD 51 to erase the vehicle image 56s associated with each caution image 56c as illustrated in FIG. 9 after the display control period set by the caution display sub-block 546 has elapsed, to thereby cancel the association. In the present embodiment, the display of each caution image 56c whose association with the vehicle image 56s has been canceled is reduced and concentrically displayed in the display range 51a of the MFD 51. As a result, during a display control period set by the cancel display sub-block 547 within the opening period Po, only the caution images 56c are displayed in a reduced sizes on the MFD 51.

With the above-described configuration, the first opening display mode Mo1 is executed during respective display control periods set by the sub-blocks 545, 546, and 547. Therefore, in the present embodiment, the MFD 51 used in the first opening display mode Mo1 corresponds to a "first opening display unit".

Figure 10:
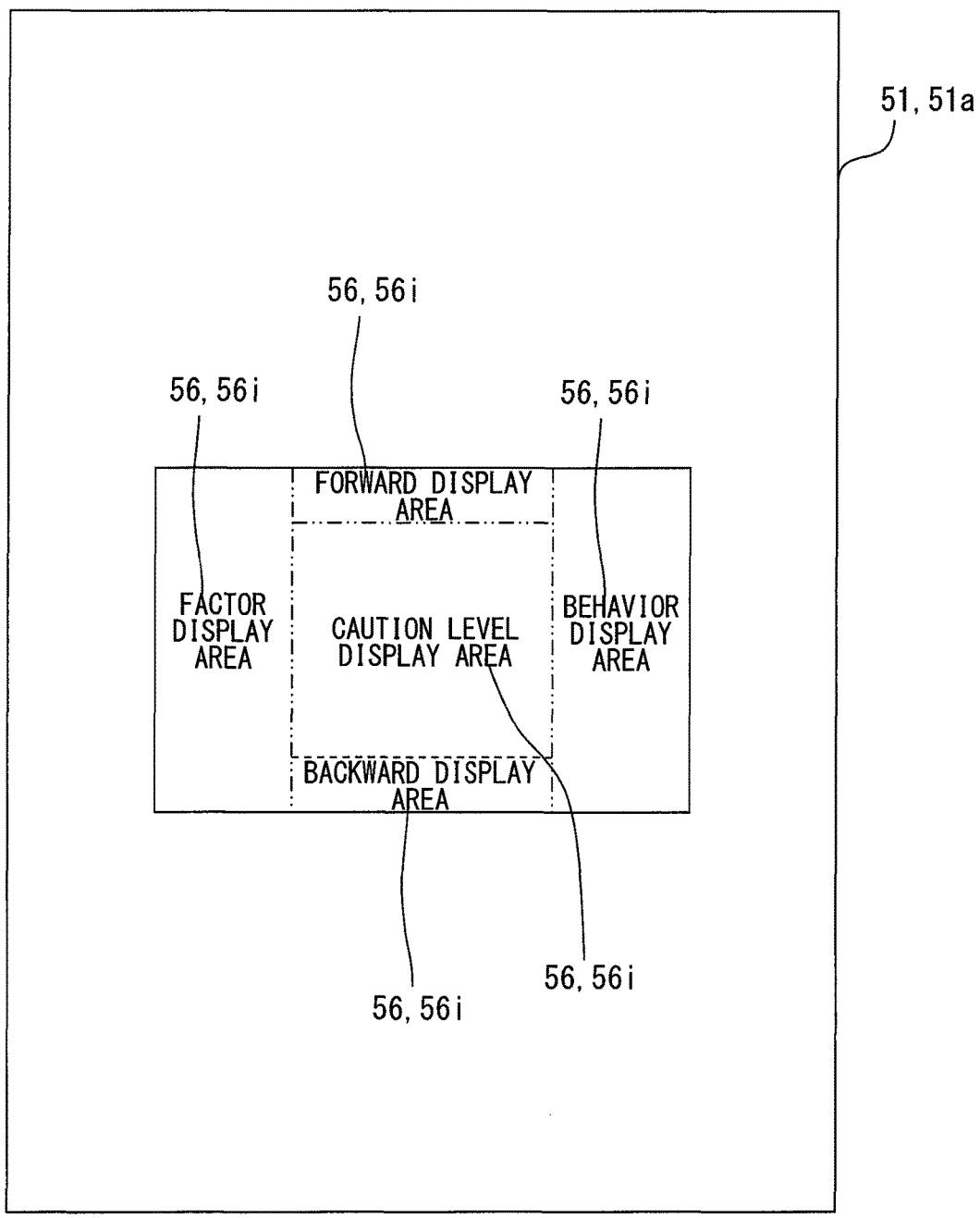
FIG. 10 is a front view illustrating one display state of the MFD shown in FIG. 1.

The second opening display block 544 illustrated in FIG. 11 moves each caution image 56c displayed on the MFD 51 to the HUD 50 as illustrated in FIG. 4 after elapse of the display control period set by the cancel display sub-block 547 within the opening period Po. In the present embodiment, after the association of each caution image 56c with the vehicle image 56s is canceled and size of each caution image 56c is reduced on the MFD 51, the caution images 56c are displayed in the display range 50a of the HUD 50 with substantially the same size as the display size on the MFD 51. As illustrated in FIG. 10, in the present embodiment, each caution image 56c to be moved is erased from the display range 51a of the MFD 51, and multiple notification images 56i are read from the memory 54m and displayed in the range 51a. The images 56c and 56i may be animated as a moving image in which each of the notification images 56i fades in at each display portion while each of the caution images 56c fades out at each display portion. Alternatively, all of the notification images 56i may be displayed after the complete erasure of the caution images 56c or simultaneously with the complete erasure. Each of the notification images 56i indicates corresponding notification content (refer to FIG. 5) to be notified in association with the caution level of each caution image 56c displayed on the HUD 50 after elapse of the opening period Po. The notification images 56i are provided by character images indicated by character notation.

Specifically, one of the notification images 56i is provided by a character image, and uses character notation of the display area name to indicate that the occurrence factor of the driving risk having the caution level L is to be notified in a factor display area of the display range 51a of the MUD 51. Another one of the notification images 56i is provided by a character image, and uses character notation of the display area name to indicate that a driving behavior corresponding to the caution level L is to be notified in a behavior display area of the display range 51a. Another one of the notification images 56i is provided by a character image, and uses character notation of the display area name to indicate a fact that the caution level L corresponding to the front obstacle is to be notified in the front display area of the display range 51a. Still another one of the notification images 56i is provided by a character image, and uses character notation of the display area name to indicate a fact that the caution level L corresponding to the rear obstacle is to be notified in the rear display area of the display range 51a. Still another one of the notification images 56i is provided by a character image, and uses character notation of the display area name to indicate a fact that the caution level L is to be notified in the caution level display area of the display range 51a. In FIG. 10, boundaries between the display areas corresponding to the respective notification images 56i are virtually indicated by two-dot chain lines.

With the above-described configuration, the second opening display mode Mo2 is executed during the display control period, which is set by the second opening display block 544 within the opening period Po. Therefore, in the present embodiment, the HUD 50 used in the second opening display mode Mo2 corresponds to a "second opening display unit". Herein, the display of the caution image 56c on the HUD 50 by the execution of the second opening display mode Mo2 is continued even after the opening period Po is ended, but the display of the notification image 56i on the MFD 51 by the execution of the second opening display mode Mo2 is erased with completion of the opening period Po.

A normal display block 540 illustrated in FIG. 11 executes a normal display mode Mn (refer to FIG. 12) after elapse of the opening period Po. As the normal display mode Mn, the normal display block 540 continues to display each caution image 56c in the caution level display area in the display range 50a of the HUD 50, and also displays the notification image 56i selected as necessary notification image in a predetermined area as illustrated in FIG. 5. In this example, the notification image 56i is provided by a character image or a graphic image, and indicates the notification content to be notified in association with the caution level of each caution image 56c using a character notation or graphic notation.

More specifically, one of the notification images 56i is provided by a character image, and indicates the occurrence factor of the driving risk corresponding to the caution level L using a character notation in the factor display area of the display range 50a of the HUD 50. The display area of the display range 50a of the HUD 50 is smaller than the display range 51a of the MUD 51. Another one of the notification images 56i is provided by a character image, and indicates that a driving behavior corresponding to the caution level L in a behavior display area of the display range 50a using a character notation. Another one of the notification images 56i is provided by an oval image, and schematically indicates the caution level L of the front obstacle in the front display area of the display range 50a. Still another one of the notification images 56i is provided by an oval image (not shown), and schematically indicates the caution level L of the rear obstacle in the rear display area of the display range 50a. When the oval image is displayed as the notification image 56i in the front display area or in the rear display area, the normal display block 540 changes an image corresponding to the caution level L among the multiple caution images 56c displayed in the caution level display area, for example, as illustrated in FIG. 5. With the above-described configuration, a caution about the driving risk can be given to the user from a pre-activation stage of the AEB.

According to the HCU 54 that includes the blocks 541, 542, 543, 544, and 540 described above, as illustrated in FIG. 12 and FIG. 13, a vehicle display control flow functioning as the "vehicle display control method" is executed. The details of the vehicle display control flow will be described below. Symbol "S" in the vehicle display control flow means a step.

Figure 12:
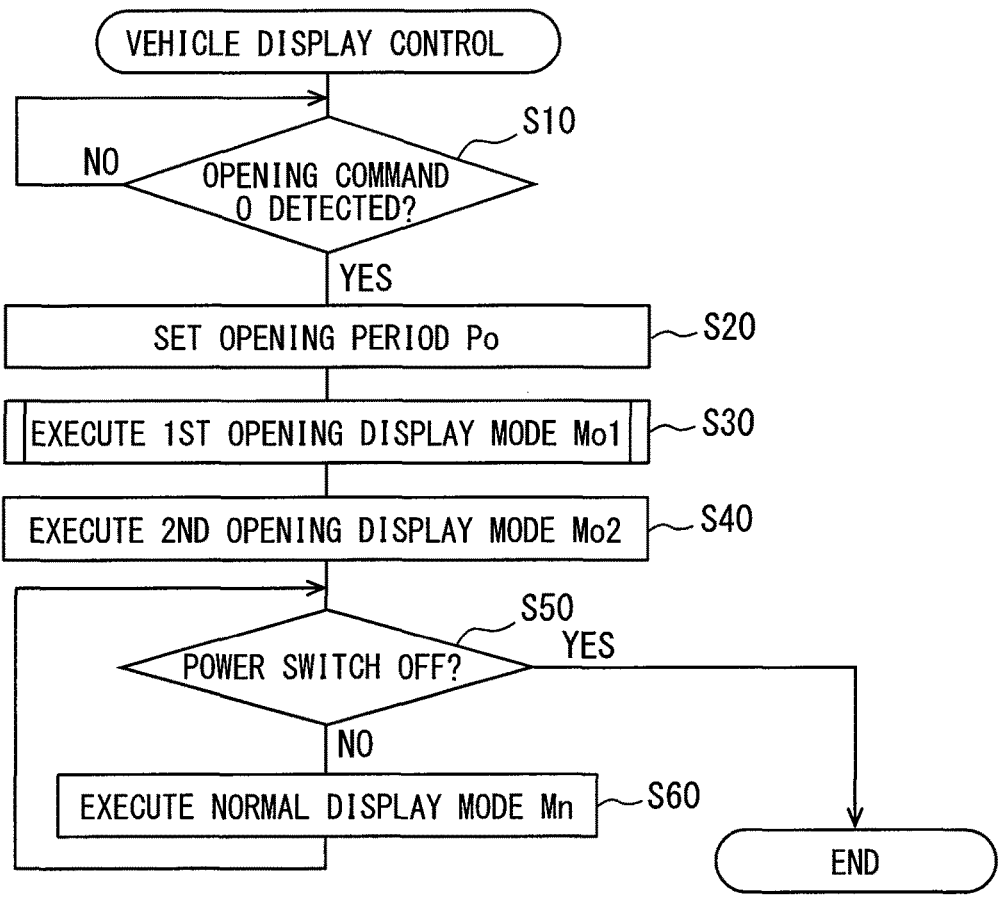
FIG. 12 is a flowchart illustrating a vehicle display control process executed by the HCU shown in FIG. 2.

In S10 of the vehicle display control flow illustrated in FIG. 12, the opening detection block 541 determines whether the opening command O from the user of the vehicle 2 is detected, or not. The opening command O is assumed to be the turn-on operation of the power switch. As a result of the determination in S10, S10 is repeated until the opening command O is detected, and when the command O is detected, the process proceeds to S20.

In S20, the opening period Po is set by the period setting block 542. In the subsequent S30, the first opening display mode Mo1 is executed by the first opening display block 543 during the opening period Po.

Figure 13:
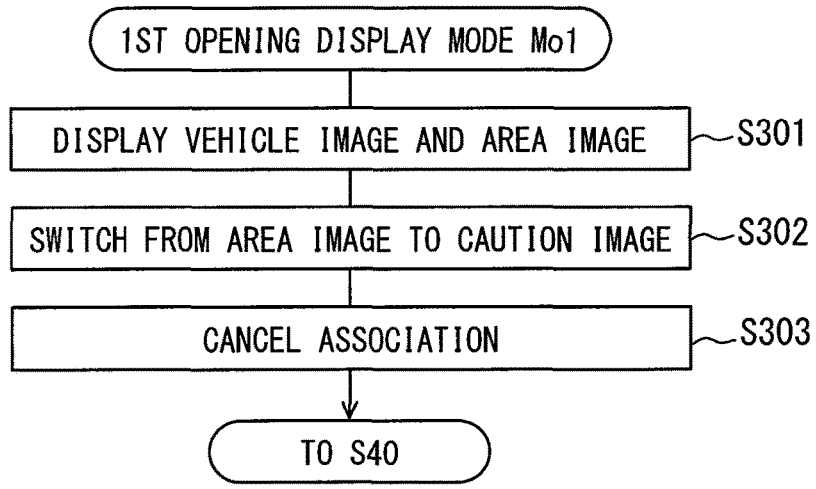
FIG. 13 is a flowchart illustrating a first opening display mode executed in S30 of FIG. 7A to FIG. 7D.

Specifically, in S301 of the first opening display mode Mo1 illustrated in FIG. 13, the vehicle image 56s and multiple area images 56a associated with the vehicle image 56s are read from the memory 54m by the area display sub-block 545 and displayed on the MFD 51. In the MFD 51 according to the present embodiment, the respective area images 56a are sequentially displayed in order from the external sensor 30 having the shortest maximum detection distance D.

Next, in S302 of the first opening display mode Mo1, the caution display sub-block 546 switches the area images 56a displayed on the MFD 51 to caution images 56c read out from the memory 54m. In this situation, on the MFD 51 according to the present embodiment, the caution images 56c and the vehicle image 56s are animated as a moving image in which all of the caution images 56c associated with the vehicle image 56s fade in while all of the area images 56a associated with the vehicle image 56s fade out.

Subsequently, in S303 of the first opening display mode Mo1, the vehicle image 56s associated with the respective caution images 56c on the MFD 51 is erased by the cancel display sub-block 547, thereby canceling the association.

After the first opening display mode Mo1 has been completed in the above-described manner, the second opening display mode Mo2 is executed by the second opening display block 544 during the opening period Po in S40 of the vehicle display control flow illustrated in FIG. 12. In the second opening display mode Mo2, the display of each caution image 56c whose association with the vehicle image 56s has been canceled by the MFD 51 is moved to the HUD 50 by the second opening display block 544. On the MFD 51 according to the present embodiment, each caution image 56c to be moved to the HUD 50 is erased, and each notification image 56i read out from the memory 54m is displayed.

When the opening period Po has elapsed, in S50, it is determined by the normal display block 540 whether the power switch is turned off, or not. As a result, when the power switch is turned off, the vehicle display control flow is terminated, whereas if the switch is turned on, the process proceeds to S60.

In S60, the normal display mode Mn is executed by the normal display block 540. More specifically, in the normal display mode Mn, the display of each caution image 56c in the HUD 50 is continued, and the notification image 56i selected as necessary is displayed on the HUD 50. After then, the process returns to S50, in which display of each caution image 56c and display of the notification image 56i as necessary are executed until the power switch is turned off.

In the vehicle display control flow described above, S10 corresponds to an "opening detection step", and S20, S30 and S40 correspond to an "opening control step".

Effects

Next, effects of the above-described first embodiment will be described.

According to the first embodiment, during the opening period Po set corresponding to the detection of the opening command O from the user, the images read from the memory 54m are displayed as the sensor information on the MFD 51. The image displayed at this time associates the area image 56a indicating the detection area 30a in which the obstacle is detectable by each of the external sensors 30 with the vehicle image 56s indicating the vehicle 2. Therefore, the user can intuitively grasp and understand the function, performance and limitation of each external sensor 30 from the display of the area image 56a of each external sensor 30 associated with the vehicle image 56s. According to the above configuration, since the displayed image can assist user's understanding about each of the external sensors 30, the above device and method can contribute to the mitigation or avoidance of collision damage.

According to the first embodiment, the respective area images 56a are sequentially displayed in order from the external sensor 30 having the shortest maximum detection distance D of the detection area 30a from the vehicle 2. With this configuration, since the user can intuitively and accurately grasp the maximum detection distance D representing the detection limit of the detection area 30a of each external sensor 30 in the increasing order, the user can have a further understanding about the detection limit. Therefore, the above configuration is effective in contributing to the mitigation or avoidance of the collision damage.

According to the first embodiment, the area images 56a displayed in association with the vehicle image 56s during the opening period Po are switched to the caution image 56c read from the memory 54m. As a result, the user can easily recognize the driving risk, which relies on the obstacle distance and corresponds to the caution level L indicated by the caution image 56c after display switch, in association with the detection area 30a of each external sensor 30, which correspond to each area image 56a before display switch. Therefore, for the obstacle detected in the detection area 30a by the external sensor 30, the user can intuitively understand that there is a need to pay caution at a level corresponding to the distance from the vehicle 2 to the obstacle. Therefore, the above configuration is effective in contributing to the mitigation or avoidance of the collision damage.

According to the first embodiment, the caution image 56c switched from the area image 56a during the opening period Po is displayed in association with the vehicle image 56s. As a result, the distance from the vehicle 2 to each detection area and the distance from the vehicle 2 to each caution level area are clarified by associating the common vehicle image 56s with both of the area image 56a before display switch and the caution image 56c after display switch. As a result, the user can easily grasp the driving risk, which relies on the obstacle distance and corresponds to the caution level L indicated by the caution image 56c after display switch, in association with the detection area 30a corresponding to each area image 56a before display switch. Therefore, the user can have a further intuitive comprehension that the caution needs to be paid at a level corresponding to the distance from the vehicle 2 to the obstacle detected in the detection area 30a by the external sensor 30. Therefore, the above configuration is particularly effective in contributing to the mitigation or avoidance of the collision damage.

During the opening period Po according to the first embodiment, the area image 56a and the caution image 56c are animated as a moving image in which while the area image 56a fades out at the display portion, the caution image 56c fade in at the same position. As a result, the area image 56a before display switch and the caution image 56c after display switch are temporarily superimposed and displayed on each other. As a result, the user can easily grasp the driving risk that relies on the obstacle distance corresponding to the caution level L indicated by the caution image 56c after display switch, in association with the detection area 30a corresponding to each area image 56a before display switch. Therefore, the user can be allowed to enhance an intuitive comprehension degree that a caution needs to be paid at a level corresponding to the distance from the vehicle 2 to the obstacle detected in the detection area 30a by the external sensor 30. Therefore, the above configuration is particularly effective in contributing to the mitigation or avoidance of the collision damage.

During the opening period Po according to the first embodiment, with the execution of the first opening display mode Mo1, the MFD 51 of the display unit 5d switches the area image 56a which is associated with the vehicle image 56s to the caution image 56c so that caution image 56c is associated with the vehicle image 56s. Hence, the user can easily grasp the driving risk, which relies on the obstacle distance and corresponds to the caution level L indicated by the caution image 56c after display switch, in association with the detection area 30a corresponding to each area image 56a before display switch. Then, during the opening period Po, with execution of the second opening display mode Mo2, the display of the caution image 56c on the MFD 51 is moved to the HUD 50. After the elapse of the opening period Po, the HUD 50 continues a display of the caution image 56c among the display unit 5d. As a result, the user can associate the caution level L indicated by the caution image 56c displayed on the HUD 50 after the elapse of the opening period Po with the caution level L indicated by the caution image 56c displayed on the HUD 50 before the elapse of the opening period Po. As a result, the user can easily grasp the driving risk, which relies on the obstacle distance and corresponds to the caution level L indicated by the caution image 56c after elapse of the opening period Po, in association with the detection area 30a corresponding to each area image 56a before display switch. According to the above configuration, the user can have a further intuitive comprehension that a caution needs to be paid at a level corresponding to the distance from the vehicle 2 to the obstacle detected in the detection area 30a by each external sensor 30. Therefore, the above configuration is particularly effective in contributing to the mitigation or avoidance of the collision damage.

In the MFD 51 according to the first embodiment, with the execution of the first opening display mode Mo1 during the opening period Po, the caution image 56c which is switched from the area image 56a is displayed in association with the vehicle image 56s. Hence, the user can easily grasp the driving risk, which relies on the obstacle distance and corresponds to the caution level L indicated by the caution image 56c after display switch, in association with the detection area 30a corresponding to each area image 56a before display switch. Moreover, during the opening period Po, after the execution of the first opening display mode Mo1, the vehicle image 56s is erased from the MFD 51 and the association with the caution image 56c is canceled. Thereafter, with the execution of the second opening display mode Mo2, the caution image 56c from which the association with the vehicle image has been canceled is displayed on the HUD 50. According to the above configuration, in the display range 50a of the HUD 50 having a display area smaller than the MFD 51, in order to allow the driving risk, which relies on the obstacle distance and corresponds to the caution level L in association with the detection area 30a, the caution image 56c can be displayed with an appropriate size. Therefore, the user can continuously be aware of that a caution needs to be paid at a level corresponding to the distance from the vehicle 2 to the obstacles detected in the detection area 30a by the respective external sensors 30 until end of the opening period Po, with the use of the HUD 50 having a small display area that is less likely to prevent driving visibility. Therefore, the above configuration can significantly contribute to the mitigation or avoidance of the collision damage.

According to the first embodiment, the display of the caution image 56c moves from the MFD 51 to the HUD 50 during the opening period Po with execution of the second opening display mode Mo2. Further, in the second opening display mode Mo2, the notification image 56i is displayed on the MFD 51. In this configuration, the notification image 56i is read from the memory 54m and displayed to indicate the corresponding notification content to be notified in association with the caution image 56c after the opening period Po. Therefore, the user can have an enhanced comprehension that caution needs to be paid at a level corresponding to the distance from the vehicle 2 to the obstacle detected in the detection area 30a by each external sensor 30. Therefore, the above configuration can significantly contribute to the mitigation or avoidance of the collision damage.

Second Embodiment

A second embodiment of the present disclosure is a modification of the first embodiment.

Figure 14A:
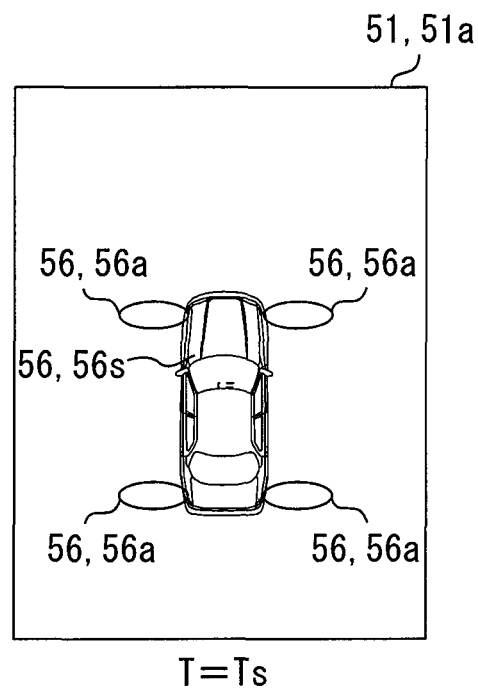
FIG. 14A is a front schematic view for illustrating a display performed by an MFD according to a second embodiment of the present disclosure.
Figure 14B:
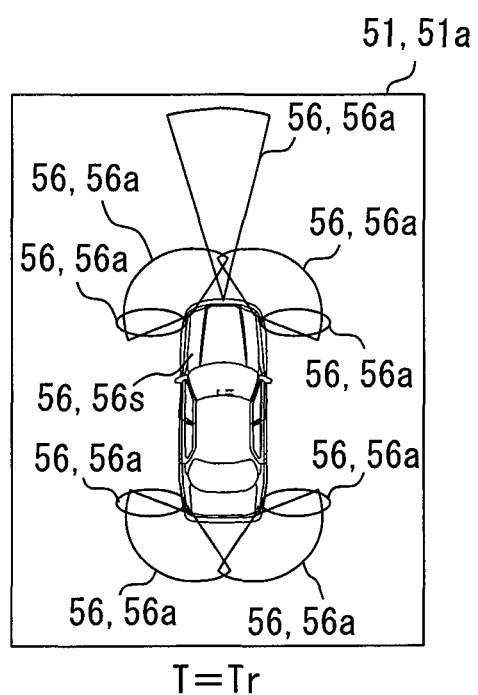
FIG. 14B is a front schematic view for illustrating the display performed by the MFD subsequent to FIG. 14A.
Figure 14C:
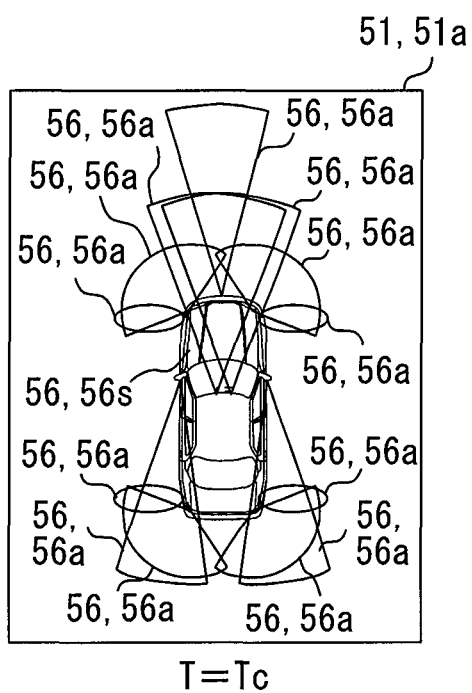
FIG. 14C is a front schematic view for illustrating the display performed by the MFD subsequent to FIG. 14B.
Figure 15A:
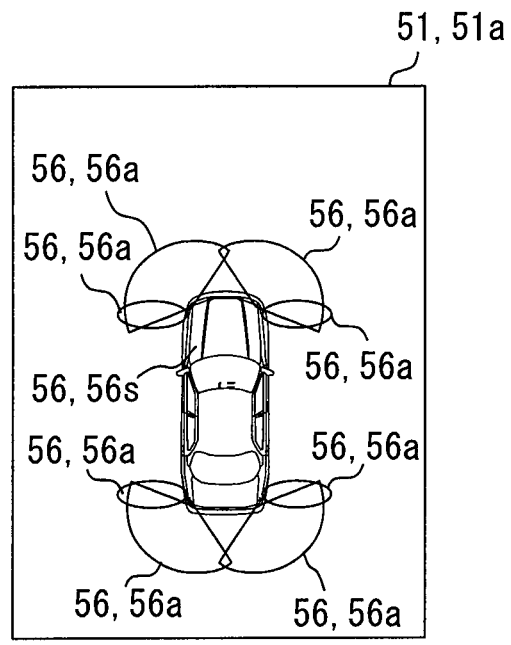
FIG. 15A is a front schematic view for illustrating a display performed by an MFD according to a third embodiment of the present disclosure.
Figure 15B:
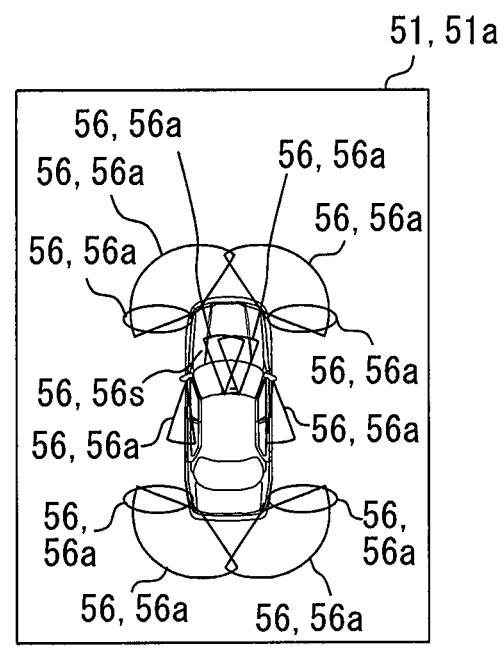
FIG. 15B is a front schematic view for illustrating the display performed by the MFD subsequent to FIG. 15A.
Figure 15C:
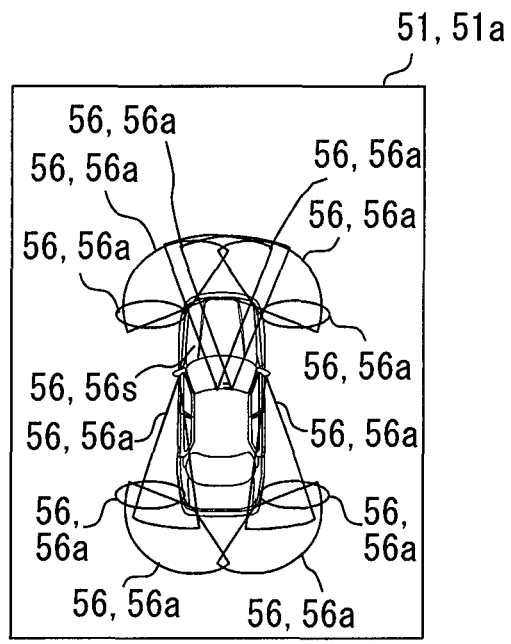
FIG. 15C is a front schematic view for illustrating the display performed by the MFD subsequent to FIG. 15B.
Figure 15D:
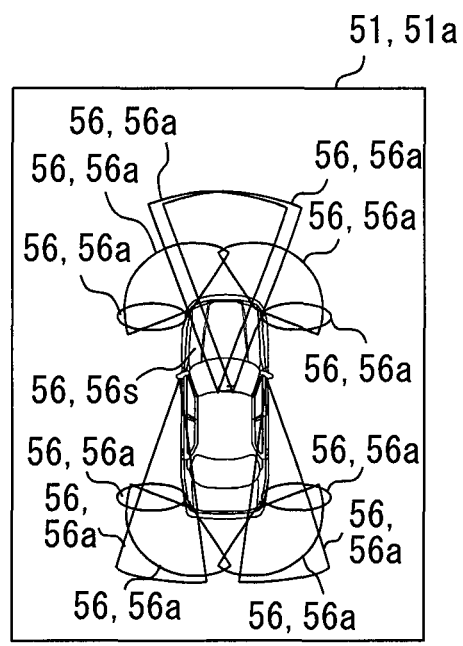
FIG. 15D is a front schematic view for illustrating the display performed by the MFD subsequent to FIG. 15C.

In the second embodiment, as illustrated in FIG. 14A to FIG. 14C, an area display sub-block 545 controls an MFD 51 to sequentially display each area image 56a in order from an external sensor 30 having a shortest start-up duration T. Herein, the start-up duration T is a duration required to start operation in response to an opening command O. Therefore, in S301 of a vehicle display control flow according to the second embodiment, each area image 56a is sequentially displayed in order from the external sensor 30 having the shortest start-up duration T.

In this example, a start-up duration Ts of sonars 301 and 302 illustrated in FIG. 14A is, for example, about 1 second, a start-up duration Tr of radars 303, 304, and 305 illustrated in FIG. 14B is, for example, about 3 seconds, and a start-up duration Tc of cameras 306 and 307 illustrated in FIG. 14C is, for example, about 5 seconds. The start-up durations Ts, Tr, and Tc of the sonars 301, 302, the radars 303, 304, 305 and the cameras 306, 307 are collectively referred to as the "start-up duration T". Thus, when the start-up durations T arranged in increasing order, the order is Ts, Tr, and Tc. Hence, in the second embodiment described above, corresponding area images 56a are superimposed and displayed on a vehicle image 56s in the stated order of the sonars 301 and 302 having Ts as illustrated in FIG. 14A, the radars 303, 304, and 305 having Tr as illustrated in FIG. 14B, and the cameras 306 and 307 having Tc as illustrated in FIG. 14C.

As described above, according to the second embodiment, the respective area images 56a are sequentially displayed in order from the external sensor 30 having the shortest start-up duration T responsive to the opening command O. As a result, since the user can intuitively and accurately grasp the start-up duration T as the performance of each external sensor 30 in increasing order, the user can have an improved understanding about the performance of the external sensor. Therefore, the above configuration is effective in contributing to the mitigation or avoidance of the collision damage.

Third Embodiment

A third embodiment of the present disclosure is a modification of the first embodiment.

According to a third embodiment, as illustrated in FIG. 15A to FIG. 15D, an area display sub-block 545 animates each area image 56a displayed on an MFD 51 as a moving image that gradually spreads out from a vehicle image 56s. Therefore, in S301 of a vehicle display control flow according to the third embodiment, each area image 56a is animated and displayed as the moving image that gradually spreads out from the vehicle image 56s.

FIG. 15A to FIG. 15D illustrate a gradually spreading display state in time order step by step. FIG. 15A to FIG. 15D indicate the area images 56a showing detection areas 306a and 307a of the cameras 306 and 307 of the external sensor 30. In actual operation, the spreading display is carried out in smooth and continuous manner. In addition, it is needless to say that the area images 56a showing detection areas 301a, 302a, 303a, 304a, and 305a corresponding to the external sensors 30 other than the cameras 306 and 307 have a gradually spreading display state similarly as illustrated in FIG. 15A to FIG. 15D.

As described above, according to the third embodiment, each area image 56a is animated and displayed as the moving image that gradually spreads out from the vehicle image 56s. As a result, the user can intuitively recognize the range of the detection area 30a spreading out from the vehicle 2 as the performance of the respective external sensors 30, for example, with an imagination that an ultrasonic wave or the like as a detection irradiation wave is emitted. Therefore, the user's understanding about the performance of the sensor can be enhanced. Therefore, the above configuration is effective in contributing to the mitigation or avoidance of the collision damage.

Fourth Embodiment

A fourth embodiment of the present disclosure is a modification of the first embodiment.

Figure 16:
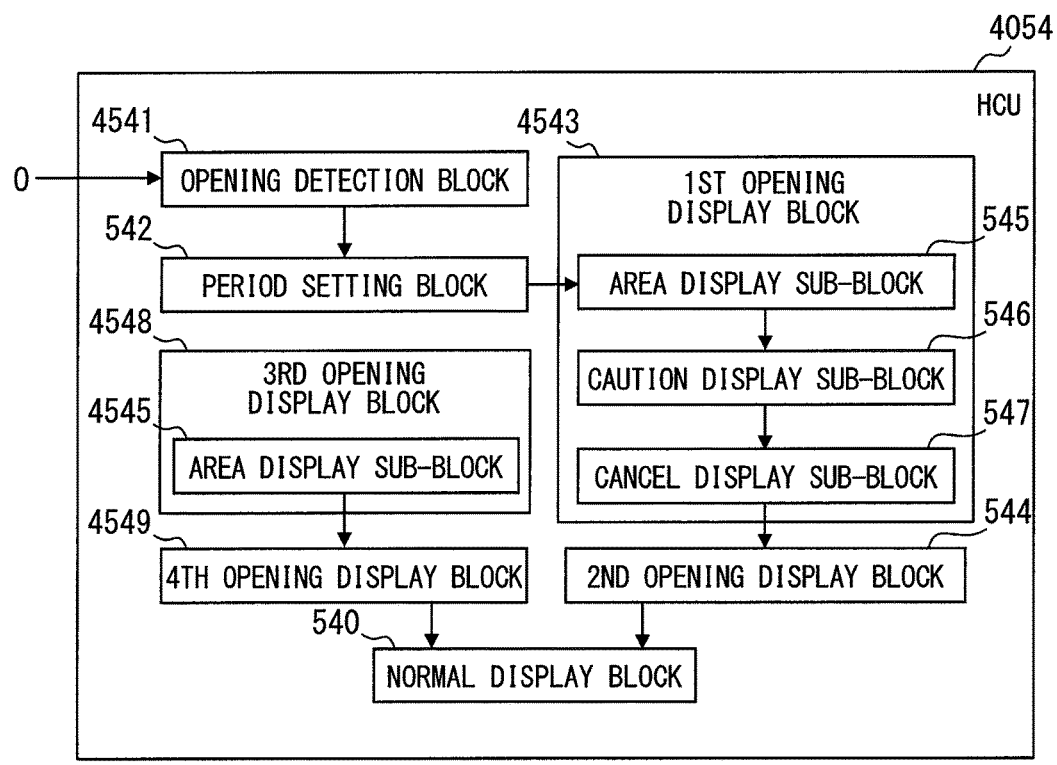
FIG. 16 is a block diagram illustrating blocks included in an HCU according to a fourth embodiment of the present disclosure.

As illustrated in FIG. 16, an HCU 4054 according to the fourth embodiment configures an opening detection block 4541 which functions as an "opening detection unit". The opening detection block 4541 determines the number of detection times of the opening command O on the same date in addition to detection of the opening command O as in the first embodiment. In this example, the opening detection block 4541 may determine the date when the detection of the opening command O is executed based on one or more of an output signal from a radio wave receiver functioning as an occupant sensor 41 or time information of an HCU 54. In addition, the opening detection block 4541 stores or updates the number of detection times of the opening command O on the same date in a memory 54m, and resets the number of detection times as the date is changed.

The HCU 4054 configures a first opening display block 4543 which functions as an "opening detection unit". The first opening display block 4543 executes a first opening display mode Mo 1 during an opening period Po when the opening detection block 4541 determines that the detection of the opening command O is the first time detection on the same date. The display control content of the first opening display mode Mo1 is the same as that of the first embodiment.

The HCU 4054 configures a third opening display block 4548 which functions as an "opening control unit". The third opening display block 4548 executes a third opening display mode Mo3 (refer to FIG. 17) during the opening period Po when the opening detection block 4541 determines that the detection of the opening command O is the second time or later time detection on the same date. Specifically, the third opening display block 4548 is configured by only an area display sub-block 4545. In this case, similarly to the area display sub-block 545 described in the first embodiment, the area display sub-block 4545 reads the vehicle image 56s and multiple area images 56a from the memory 54m and displays the images in a display range 51a of the MFD 51. Therefore, in the third opening display mode Mo3 executed by the third opening display block 4548 described above, switching from the area image 56*a* to the caution image 56*c* executed in the first opening display mode Mo1 and the cancel of the association of the images 56*c* and 56*s* from the vehicle image executed in the first opening display mode Mo1 are forbidden.

The HCU 4054 configures a fourth opening display block 4549 which functions as the "opening control unit". The fourth opening display block 4549 executes a fourth opening display mode Mo 4 (refer to FIG. 17) after a display control period set by the area display sub-block 4545 within the opening period Po is ended. More specifically, the fourth opening display block 4549 displays each caution image 56*c* in a caution level display area of the display range 50*a* of the HUD 50. In the fourth embodiment, similar to the case of the second opening display mode Mo2, each caution image 56*c* having a reduced size and the association with the vehicle image 56*s* is canceled is displayed in the display range 50*a* of the HUD 50 with substantially the same size as the display size in the display mode Mo2. Since the display of the notification image 56*i* is not executed in the MFD 51, the entire display of the images 56*s* and 56*a* may be erased before or after the entire display of the caution image 56*c* by the HUD 50 or simultaneously with the entire display.

The period setting block 542, the second opening display block 544, and the normal display block 540 configured by the HCU 4054 are the same as those in the first embodiment.

Figure 17:
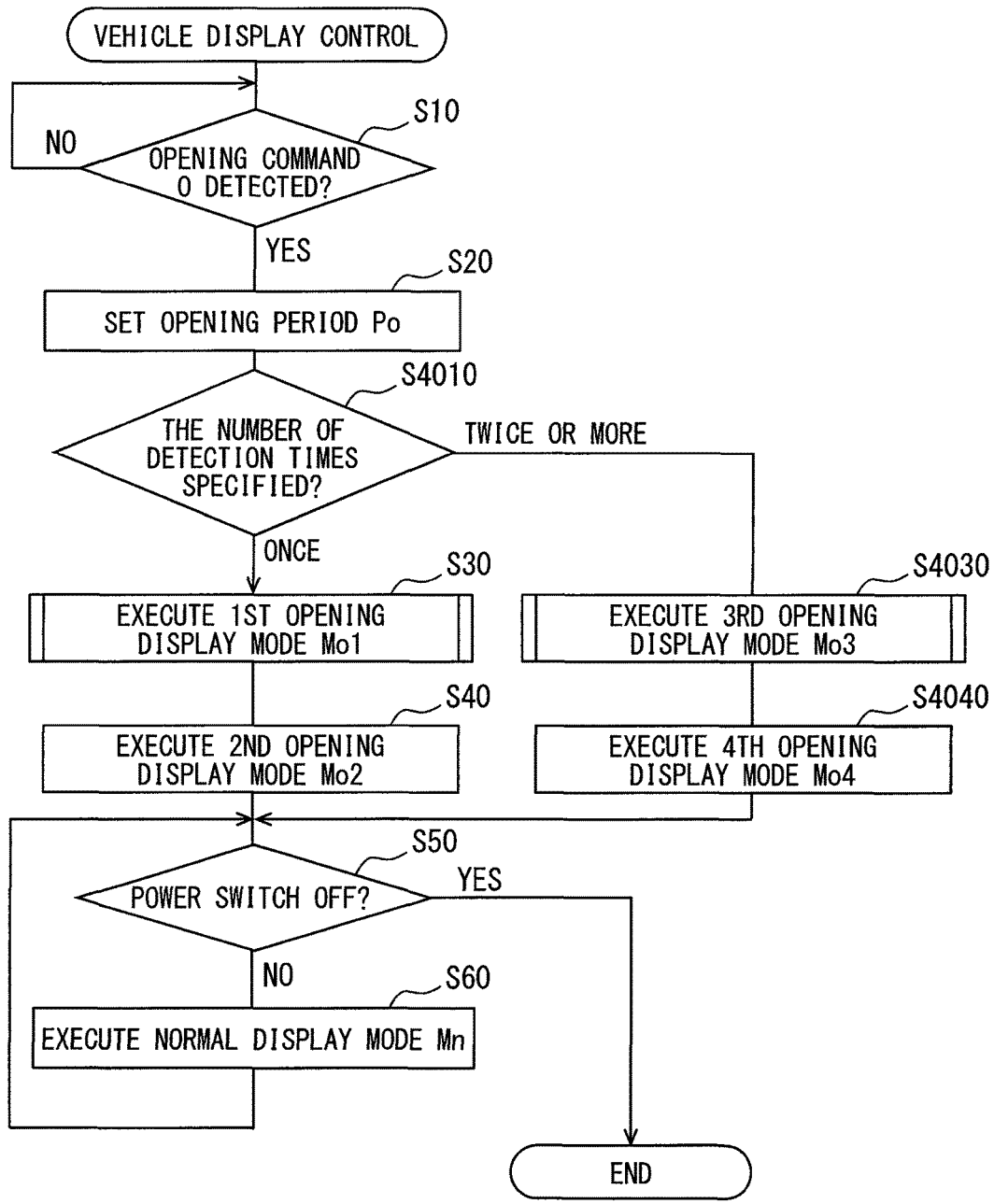
FIG. 17 is a flowchart illustrating a vehicle display control process executed by the HCU shown in FIG. 16.
Figure 18:
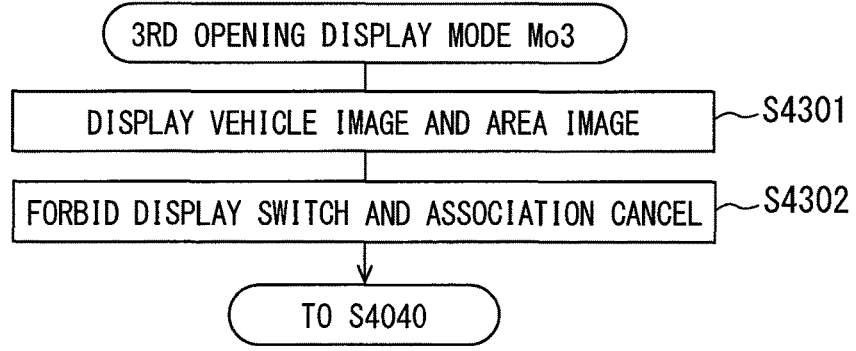
FIG. 18 is a flowchart illustrating a first opening display mode executed in S4030 of FIG. 17.

According to the HCU 4054 that configures the blocks 4541, 542, 4543, 544, 4548, 4549, and 540 described above, since the vehicle display control flow is executed as illustrated in FIG. 17 and FIG. 18, parts different from those in the first embodiment will be mainly described in detail.

In the vehicle display control flow illustrated in FIG. 17, after executing S10 and S20 similar to those in the first embodiment, the process proceeds to S4010. In S4010, the number of detection times of opening command O on the same date is determined by the first opening display block 4543. As a result, when the number of detection times is once, S30 and S40 similar to those in the first embodiment are sequentially executed. On the other hand, when the number of detection times is twice or more, S4030 and S4040 different from S30 and S40 are sequentially executed.

In S4030, the third opening display mode Mo3 is executed by the third opening display block 4548 during the opening period Po. Specifically, in S4301 of the third opening display mode Mo3 illustrated in FIG. 18, the vehicle image 56*s* and multiple area images 56*a* associated with the vehicle image 56*s* are read from the memory 54*m* by the area display sub-block 4545 and displayed on the MFD 51. Subsequently, in S4302, switching from the area image 56*a* to the caution image 56*c* in the case of the first opening display mode Mo1 and the cancel of the association between the caution images 56*c* and the vehicle image 56*s* in the case of the display mode Mo1 are forbidden by the area display sub-block 4545.

As illustrated in FIG. 17, in S4040 subsequent to S4030, the fourth opening display mode Mo4 is executed by the fourth opening display block 4549 during the opening period Po. More specifically, in the fourth opening display mode Mo4, each caution image 56*c* from which the association with the vehicle image 56*s* has been canceled is displayed on the HUD 50. In the MFD 51 according to the fourth embodiment, the display of the notification image 56*i* is not executed.

As described above, after sequential execution of S30 and S40, and even after sequential execution of S4030 and S4040, S50 and S60 similar to those in the first embodiment are executed. Therefore, in the vehicle display control flow according to the fourth embodiment, S10 and S4010 correspond to an "opening detection step", and S20, S30, S40, S4030 and S4040 correspond to an "opening control step".

As described above, according to the fourth embodiment, the first opening display mode Mo1 and the second opening display mode Mo2 are sequentially executed during the opening period Po when the opening command O is detected for the first time on the same date. As a result, the user can easily grasp the driving risk that relies on the obstacle distance corresponding to the caution level L indicated by the caution image 56*c*, in association with the detection area 30*a* corresponding to each area image 56*a* before display switch.

According to the fourth embodiment, the third opening display mode Mo3 and the fourth opening display mode Mo4 are sequentially executed during the opening period Po when the opening command O is detected for the second or later time on the same date. In this example, in the third opening display mode Mo3, switching from the area image 56*a* displayed in association with the vehicle image 56*s* on the MFD 51 to the caution image 56*c* in the first opening display mode Mo1 is forbidden. Therefore, the user can be restrained from feeling annoying due to repeated display of the caution image 56*c* on the same date. In the fourth opening display mode Mo4 after such a third opening display mode Mo3, the caution image 56*c* is displayed on the HUD 50. As a result, the user can easily grasp the driving risk that relies on the obstacle distance corresponding to the caution level L indicated by the caution image 56*c* on the HUD 50, in association with the detection area 30*a* corresponding to each area image 56*a* on the MFD 51.

According to the above configuration, the intuitive comprehension that an attention of the level corresponding to the distance from the vehicle 2 to the obstacle is required for the obstacle, regardless of the number of detection times can be enhanced while suppressing the troubles caused by the number of detection times of the opening command O. Therefore, the above configuration can contribute to the mitigation or avoidance of the collision damage while improving driving experience felt by the user.

Other Embodiments

Hereinbefore, multiple embodiments of the present disclosure are described. However, the present disclosure is not interpreted to be limited to the above-described embodiments, and various embodiments and combinations thereof may be applied within a scope which does not depart from the gist of the present disclosure.

In sub-blocks 545, 4545 and S301, S4301 according to first modification, as a display order of each area image 56*a*, an order other than that described in the first embodiment and the second embodiment, for example, an order set according to the user's operation of a display setting switch may be employed. In sub-blocks 545, 4545 and S301, 54301 according to second modification, all of the area images 56*a* may be simultaneously displayed.

In sub-blocks 545, 4545 and S301, S4301 of third modification, for example, only an area image 56*a* corresponding to a detection area 30*a* of an external sensor 30 selected according to the operation made on the display setting switch by the user may be displayed. In fourth modification, the sequence display of each area image 56*a* according to the second embodiment may be employed in the sub-blocks 545, 4545 and S301, S4301 of the fourth embodiment. In fifth modification, the animation display of each area image 56*a* according to the third embodiment may be employed in the sub-blocks 545, 4545 and S301, S4301 of the second embodiment or the fourth embodiment.

Figure 19:
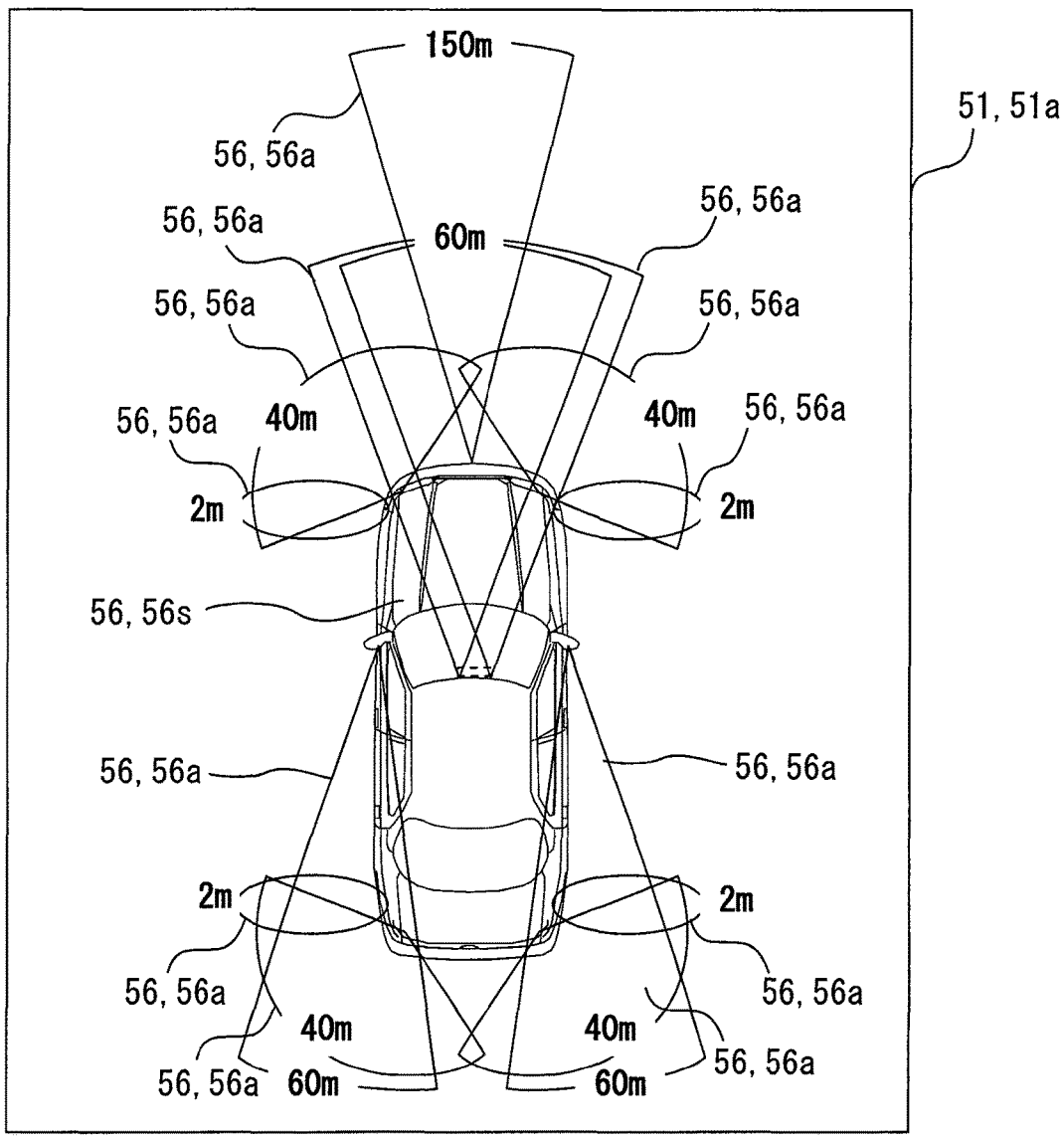
FIG. 19 is a front view illustrating a modification of the display state illustrated in FIG. 6.

As illustrated in FIG. 19, in sub-blocks 545, 4545 and S301, S4301 of sixth modification, a character image in which a maximum detection distance D of each detection area 30a is represented by a character notation may be attached to each area image 56a when displaying the area images. In sub-blocks 545, 4545 and S301, S4301 of seventh modification, for example, along with the display of an area image 56a or the like corresponding to a detection area 305a of a long distance millimeter wave radar 305 having the long maximum detection distance D, other area images 56a and the vehicle image 56s may be reduced. In seventh modification described above, a ratio of the separation distances from the vehicle image 56s to the most distant portions of the outer contour lines of the respective area images 56a can substantially match a ratio of the maximum detection distances D of the corresponding detection areas 30a.

In blocks 543, 4543 and S30, S4030 of eighth modification, the sub-block 547 and S303 may not be employed. In the blocks 543, 4543 and S30, S4030 of ninth modification, the association between the image 56s and the caution image 56c may be canceled by erasing the vehicle image 56s in the sub-blocks 546 and S302. In such ninth modification, the above-described eighth modification may be employed jointly or not.

In tenth modification, in the block 543 and S30 of the first embodiment, the second embodiment, or the third embodiment, the third opening display mode Mo3 according to the fourth embodiment may be executed in place of the first opening display mode Mo1. In other words, in tenth modification, the sub-blocks 546, 547 and S302, S303 may be employed in the blocks 543 and S30 of the first embodiment, the second embodiment or the third embodiment.

In blocks 544, 4549, 540 and S40, S4040, S60 of eleventh modification, with display of a vehicle image 56s, a caution image 56c may be displayed in association with the image 56s. In the block 4548 and S4030 of the fourth embodiment to which eleventh modification is applied, a sub-block 546 and S302 or a sub-block 547 and S303 may be added. Incidentally, in the case of adding the sub-block 547 and S303 in this manner, the block 544 and 540 may be employed instead of the block 4549 and S4040.

In a sub-block 546 and S302 of twelfth modification, all of the area images 56a may be erased after the entire display of the caution image 56c or at the same time as that of the entire display. In thirteenth modification, the block 544 and S40 may not be employed. In fourteenth modification, in the fourth embodiment, the block 4549 and S4040 may not be employed in place of or in addition to thirteenth modification. In fifteenth modification, the notification image 56i may not be displayed in the sub-block 547 and S303.

In sixteenth modification, in the block 4541 and S4010 according to the fourth embodiment, a determination condition other than the number of detection times of the opening command O on the same date may be employed. As the determination condition in sixteenth modification, for example, a cumulative number of detection times or an elapsed time from a first opening command O after shipment from a factory, a time interval of the opening command O between the previous time and this time, a detection place of the opening command O, and the like, are employed. In this example, when the cumulative number of detection times is small as the determination condition, the display modes Mo1 and Mo2 are executed by the blocks 4543, 544 and S30, S40, and when the cumulative detection count is large, the display modes Mo3 and Mo4 are executed by the blocks 4548, 4549 and S4030, S4040. When the elapsed time is short as the determination condition, the display modes Mo1 and Mo2 are executed by the blocks 4543 and 544 and S30 and S40. When the elapsed time is long, the display modes Mo3 and Mo4 are displayed by the blocks 4548 and 4549 and the S4030 and S4040. Further, when the time interval is long as the determination condition, the display modes Mo1 and Mo2 are executed by the blocks 4543, 544 and S30, S40, and when the time interval is short, the display modes Mo3 and Mo4 are displayed by the blocks 4548, 4549 and the S4030, S4040. Further, when the detection location is a user's home as the determination condition, the display modes Mo1 and Mo2 are executed by the blocks 4543, 544 and S30, S40, and when the detection location is other than the home, the display modes Mo3 and Mo4 are executed by the blocks 4548, 4549 and S4030, S4040.

In seventeenth modification, at least one of an HUD 50 and a combination meter 52 may be employed instead of or in addition to an MFD 51 as a display destination of images 56s, 56a, and 56c in blocks 543, 4543 and S30, S4030. In the display destination of seventeenth modification, the image 56i is displayed in a block 544 and S40. Incidentally, such a display destination corresponds to a "first opening display unit".

Figure 20:
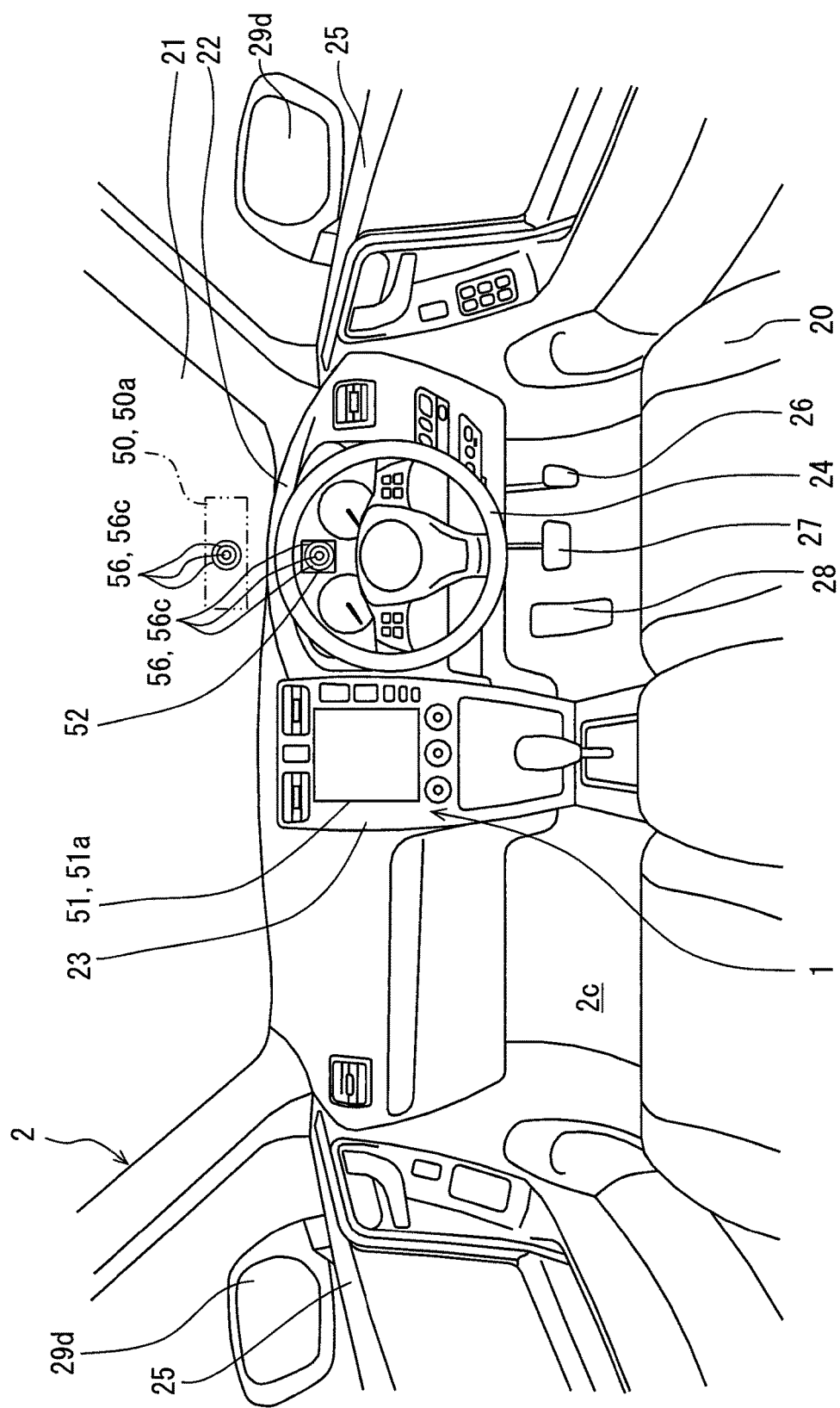
FIG. 20 is a diagram illustrating a compartment of a vehicle equipped with a travel assist system according to a modification.

In eighteenth modification, at least one of an MFD 51 and a combination meter 52 may be employed instead of or in addition to an HUD 50 as a destination or a display destination of a caution image 56c in blocks 544, 4549, 540 and S40, S4040, S60. In this example, FIG. 20 illustrates eighteenth modification in the case where both of the HUD 50 and the combination meter 52 are employed as such a destination or a display destination. It should be noted that such a destination or a display destination corresponds to a "second opening display unit".

Figure 21:
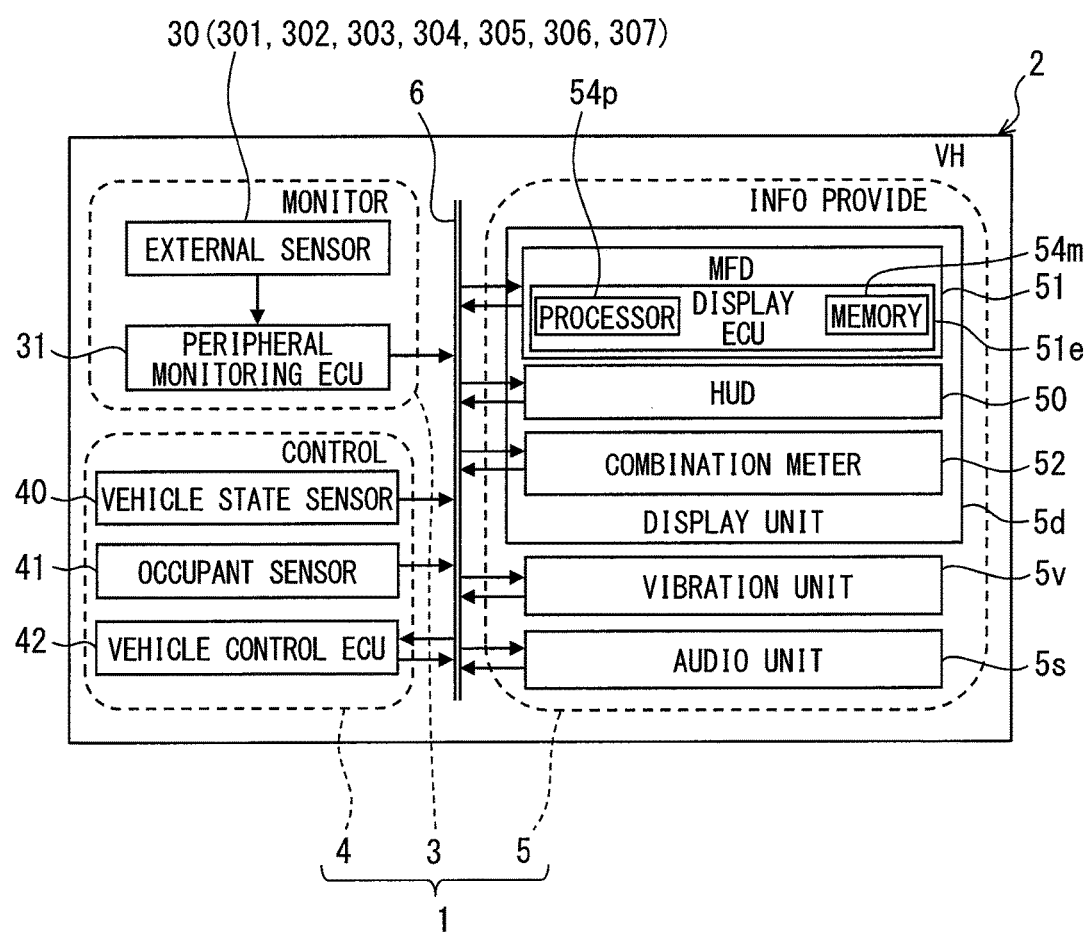
FIG. 21 is a block diagram illustrating a configuration of a travel assist system according to a modification of the travel assist system shown in FIG. 2.

In nineteenth modification, no HCU 54 may be provided. In such nineteenth modification, for example, one or more of the ECUs 31 and 42 and the display ECUs provided for controlling the display elements 50, 51 and 52 may function as the "vehicle display control device". In other words, the blocks 541, 542, 543, 544, and 540 may be configured by a processor included in one or more types of ECUs to realize a vehicle display control flow as a "vehicle display control method". In this example, FIG. 21 illustrates nineteenth modification in the case where the ECU 51e having the processor 54p and the memory 54m in the MFD 51 performs the function of the "vehicle display control device".

In twentieth modification, the external sensors 30 other than the sonars 301, 302, the radars 303, 304, 305 and the cameras 306, 307, for example, a laser radar or the like may be adopted. In twenty first modification, at least one of the sonars 301, 302, the radars 303, 304, 305 and the cameras 306, 307 may not be employed as long as the number of the external sensors 30 is plural. According to such twentieth and twenty first modifications, with a change in the number of display of the area image 56a for each vehicle type of the vehicle 2, the user is conscious of excess or deficiency of safety performance corresponding to the vehicle type, and can lead to an appropriate driving behavior.

In blocks 543, 544, 540, 4543, 4548, 4549 and S30, S40, S60, S4030, S4040 of twenty second modification, at least one of an audio unit 5s and a vibrating unit 5v may be operated simultaneously with display. In twenty third modification, a display area of a display range 50a in an HUD 50 may be set to be larger or equal to a display area of a display range 51a in an MFD 51.

It is noted that a flowchart or the processing of the flowchart in the present disclosure includes blocks (also referred to as steps), each of which is represented, for instance, as S10. Further, each block can be divided into several sub-blocks while several blocks can be combined into a single section. Furthermore, each of thus configured blocks can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A vehicle display control device that controls a display of sensor information on a display unit of a vehicle corresponding to each of a plurality of external sensors, wherein the vehicle is equipped with the display unit and the plurality of external sensors each of which detects an obstacle existing outside of the vehicle, the vehicle display control device comprising:
   an opening detection unit, using a processor, that detects an opening command made by a user to the vehicle;
   an image storage that stores a vehicle image indicating the vehicle and a plurality of area images indicating a plurality of detection areas of the plurality of external sensors in association with the vehicle image, the obstacle is detectable within the plurality of detection areas; and
   an opening control unit, using the processor, that reads, in response to a detection of the opening command by the opening detection unit, the vehicle image and each of the plurality of area images from the image storage, and displays the vehicle image and each of the plurality of area images on the display unit as the sensor information during an opening period, wherein
   the image storage further stores a caution image indicating a caution level corresponding to a driving risk of the vehicle, and the driving risk relies on a distance from the vehicle to the obstacle,
   during the opening period, the opening control unit reads the caution image from the image storage, and switches the plurality of area images displayed on the display unit to the caution image after displaying the plurality of area images in association with the vehicle image, and
   during the opening period, the opening control unit sequentially executes:
      a first opening display mode in which the plurality of area images displayed on a first opening display unit of the display unit are switched to the caution image after the plurality of area images are displayed in association with the vehicle image; and
      a second opening display mode in which the caution image displayed on the first opening display unit is moved to a second opening display unit of the display unit, and the second opening display unit displays the caution image after an elapse of the opening period.

2. The vehicle display control device according to claim 1, wherein
   the opening control unit controls each of the plurality of area images to be sequentially displayed on the display unit in an increasing order of a maximum detection distance of each of the plurality of external sensors, and
   the maximum detection distance is a distance from the vehicle to the obstacle detectable within the corresponding detection area.

3. The vehicle display control device according to claim 1, wherein
   the opening control unit controls each of the plurality of area images to be sequentially displayed on the display unit in an increasing order of a start-up duration of each of the plurality of external sensors, and
   the start-up duration is a duration required for each of the plurality of external sensors to start an operation in response to the opening command.

4. The vehicle display control device according to claim 1, wherein
   the opening control unit displays, on the display unit, each of the plurality of area images as a moving image in which the corresponding detection area gradually spreads out from the vehicle image.

5. The vehicle display control device according to claim 1, wherein
   the opening control unit controls the display unit to display the caution image switched from the plurality of area images in association with the vehicle image.

6. The vehicle display control device according to claim 1, wherein
   the opening control unit controls the display unit to display, on the display unit, each of the caution image and the plurality of area images as a moving image in a manner that the caution image fades in at a predetermined display portion while the plurality of area images fade out at the predetermined display portion.

7. The vehicle display control device according to claim 1, wherein
   the opening control unit sequentially executes:
   the first opening display mode in which the caution image switched from the plurality of area images is displayed in association with the vehicle image on the first opening display unit and then an association between the caution image and the vehicle image is canceled by erasing the vehicle image; and
   the second opening display mode in which the caution image which has no association with the vehicle image is displayed on the second opening display unit having a smaller display area than that of the first opening display unit.

8. The vehicle display control device according to claim 1, wherein
   the image storage stores a notification image prepared for notifying a notification content in association with the caution level indicated by the caution image after the elapse of the opening period, and,
   in the second opening display mode, the opening control unit moves the caution image from the first opening display unit to the second opening display unit, reads the notification image from the image storage, and displays the notification image on the first opening display unit.

9. The vehicle display control device according to claim 1, wherein,
- when the opening detection unit detects the opening command for a first time during a day, the opening control unit sequentially executes the first opening display mode and the second opening display mode during the opening period,
- when the opening detection unit detects the opening command for a second or more time during a day, the opening control unit sequentially executes a third opening display mode and a fourth opening display mode instead of the first opening display mode and the second opening display mode during the opening period,
- in the third opening display mode, the opening control unit deactivates a display switch from the plurality of detection areas to the caution image executed in the first opening display mode, and
- in the fourth opening display mode, the opening control unit displays the caution image on the second opening display unit.

10. A vehicle display control method of controlling a display of sensor information on a display unit of a vehicle corresponding to each of a plurality of external sensors, wherein the vehicle is equipped with the display unit and the plurality of external sensors each of which detects an obstacle existing outside of the vehicle,
the vehicle display control method comprising:
- detecting an opening command made by a user to the vehicle;
- in response to a detection of the opening command, reading, from an image storage that stores a vehicle image indicating the vehicle and a plurality of area images indicating a plurality of detection areas of the plurality of external sensors in association with the vehicle image, the vehicle image and the plurality of area images, wherein the obstacle is detectable within the plurality of detection areas, the image storage further stores a caution image indicating a caution level corresponding to a driving risk of the vehicle, and the driving risk relies on a distance from the vehicle to the obstacle; and
- displaying the vehicle image and each of the plurality of area images which are read from the image storage on the display unit as the sensor information during an opening period;
- during the opening period, reading the caution image from the image storage and switching the plurality of area images displayed on the display unit to the caution image after displaying the plurality of area images in association with the vehicle image; and
- during the opening period, sequentially executing:
  - a first opening display mode in which the plurality of area images displayed on a first opening display unit of the display unit are switched to the caution image after the plurality of area images are displayed in association with the vehicle image; and
  - a second opening display mode in which the caution image displayed on the first opening display unit is moved to a second opening display unit of the display unit, wherein the second opening display unit displays the caution image after an elapse of the opening period.

* * * * *